United States Patent
Albano et al.

(10) Patent No.: US 12,027,661 B2
(45) Date of Patent: Jul. 2, 2024

(54) NANO-ENGINEERED COATINGS FOR ANODE ACTIVE MATERIALS, CATHODE ACTIVE MATERIALS, AND SOLID-STATE ELECTROLYTES AND METHODS OF MAKING BATTERIES CONTAINING NANO-ENGINEERED COATINGS

(71) Applicant: Forge Nano Inc., Thornton, CO (US)

(72) Inventors: Fabio Albano, Troy, MI (US); Kevin Dahlberg, Troy, MI (US); Erik Anderson, Troy, MI (US); Subhash Dhar, Troy, MI (US); Srinivasan Venkatesan, Troy, MI (US)

(73) Assignee: Forge Nano Inc., Thornton, CO (US)

( * ) Notice: Subject to any disclaimer, the term of this patent is extended or adjusted under 35 U.S.C. 154(b) by 327 days.

(21) Appl. No.: 14/727,834

(22) Filed: Jun. 1, 2015

(65) Prior Publication Data
US 2016/0351943 A1    Dec. 1, 2016

(51) Int. Cl.
| | | |
|---|---|---|
| *H01M 10/056* | (2010.01) | |
| *H01M 4/13* | (2010.01) | |
| *H01M 4/36* | (2006.01) | |
| *H01M 4/62* | (2006.01) | |
| *H01M 10/0525* | (2010.01) | |
| *H01M 10/0562* | (2010.01) | |

(52) U.S. Cl.
CPC .......... *H01M 10/056* (2013.01); *H01M 4/13* (2013.01); *H01M 4/366* (2013.01); *H01M 4/628* (2013.01); *H01M 10/0525* (2013.01); *H01M 10/0562* (2013.01)

(58) Field of Classification Search
CPC ........ H01M 4/366; H01M 4/628; H01M 4/13; H01M 4/131; H01M 4/134; H01M 4/525; H01M 4/1391; H01M 4/48; H01M 4/50; H01M 4/505; H01M 4/52
USPC .......................................................... 429/126
See application file for complete search history.

(56) References Cited

U.S. PATENT DOCUMENTS

| | | |
|---|---|---|
| 6,613,383 B1 | 9/2003 | George et al. |
| 6,713,177 B2 | 3/2004 | George et al. |
| 6,911,280 B1 | 6/2005 | De Jonghe et al. |
| 6,913,827 B2 | 7/2005 | George et al. |

(Continued)

FOREIGN PATENT DOCUMENTS

| | | |
|---|---|---|
| CA | 2674783 A1 | 6/2010 |
| CN | 102244231 A | 11/2011 |

(Continued)

OTHER PUBLICATIONS

Jyh-Tsung Lee et al, "Low-temperature Atomic Layer Deposited $Al_2O_3$ Thin Film on Layer Structure Cathode for Enhanced Cycleability in Lithium-ion Batteries," Electrochimica Acta 55 (2010), pp. 4002-4006.

(Continued)

*Primary Examiner* — Brian R OHara
*Assistant Examiner* — Patrick Marshall Greene
(74) *Attorney, Agent, or Firm* — Frank Rosenberg

(57) ABSTRACT

The present disclosure relates to a nano-engineered coating for cathode active materials, anode active materials, and solid state electrolyte materials for reducing corrosion and enhancing cycle life of a battery, and various process for applying the disclosed coating.

22 Claims, 13 Drawing Sheets

(56) References Cited

U.S. PATENT DOCUMENTS

| | | |
|---|---|---|
| 6,958,174 B1 | 10/2005 | Klaus et al. |
| 7,081,267 B2 | 7/2006 | Yadav |
| 7,081,367 B2 | 7/2006 | Shiraishi |
| 7,132,697 B2 | 11/2006 | Weimer et al. |
| 7,211,236 B2 | 5/2007 | Stark et al. |
| 7,396,862 B2 | 7/2008 | Weimer et al. |
| 7,413,982 B2 | 8/2008 | Levy |
| 7,426,067 B1 | 9/2008 | Bright et al. |
| 7,553,686 B2 | 6/2009 | George et al. |
| 7,658,340 B2 | 2/2010 | Pfeffer et al. |
| 7,833,437 B2 | 11/2010 | Fan et al. |
| 8,124,179 B2 | 2/2012 | Nilsen et al. |
| 8,133,531 B2 | 3/2012 | King et al. |
| 8,163,336 B2 | 4/2012 | Weimer et al. |
| 8,187,731 B2 | 5/2012 | Weimer et al. |
| 8,439,283 B2 | 5/2013 | Pfeffer et al. |
| 8,531,090 B2 | 9/2013 | Spencer, II |
| 8,637,156 B2 | 1/2014 | Weimer et al. |
| 8,735,003 B2 | 5/2014 | Kim et al. |
| 8,808,901 B2 | 8/2014 | Wang et al. |
| 8,894,723 B2 | 11/2014 | Nilsen et al. |
| 8,956,761 B2 | 2/2015 | Reynolds et al. |
| 8,993,051 B2 | 3/2015 | Kelder et al. |
| 9,005,816 B2 | 4/2015 | Amine et al. |
| 9,059,451 B2 | 6/2015 | Xiao et al. |
| 9,093,707 B2 | 7/2015 | Lee et al. |
| 9,107,851 B2 | 8/2015 | Dave et al. |
| 9,243,330 B2 | 1/2016 | Granneman et al. |
| 9,246,164 B2 | 1/2016 | Lu et al. |
| 10,230,099 B2 | 3/2019 | Uchiyama |
| 2001/0041294 A1* | 11/2001 | Chu ............... H01M 4/0438 |
| | | 429/231.9 |
| 2003/0054250 A1 | 3/2003 | Kweon et al. |
| 2004/0194691 A1 | 10/2004 | George et al. |
| 2007/0004590 A1 | 1/2007 | Furuta |
| 2007/0281089 A1 | 12/2007 | Heller et al. |
| 2008/0011508 A1 | 1/2008 | Sunohara et al. |
| 2008/0057386 A1 | 3/2008 | Visco et al. |
| 2008/0221806 A1* | 9/2008 | Bryant ............ G01N 27/127 |
| | | 702/22 |
| 2009/0214927 A1 | 8/2009 | Dadheech et al. |
| 2010/0035152 A1 | 2/2010 | Sastry et al. |
| 2010/0109130 A1 | 5/2010 | Pinna et al. |
| 2010/0123993 A1 | 5/2010 | Laor |
| 2010/0178481 A1 | 7/2010 | George et al. |
| 2010/0203388 A1* | 8/2010 | Kim ............... H01M 4/364 |
| | | 429/223 |
| 2011/0104553 A1 | 5/2011 | Pol et al. |
| 2011/0236575 A1 | 9/2011 | King et al. |
| 2011/0311882 A1 | 12/2011 | Kim et al. |
| 2012/0077082 A1* | 3/2012 | Se-Hee ............ H01M 4/485 |
| | | 429/209 |
| 2012/0094213 A1 | 4/2012 | Ha et al. |
| 2012/0121932 A1 | 5/2012 | George et al. |
| 2012/0145953 A1 | 6/2012 | Pallem et al. |
| 2012/0161456 A1 | 6/2012 | Riedmayr et al. |
| 2012/0301778 A1 | 11/2012 | Trevey et al. |
| 2013/0164628 A1 | 6/2013 | Visco et al. |
| 2013/0177808 A1* | 7/2013 | Wang ............... C23C 16/402 |
| | | 429/219 |
| 2013/0224632 A1 | 8/2013 | Roumi |
| 2013/0244063 A1 | 9/2013 | Dhar et al. |
| 2013/0266842 A1 | 10/2013 | Woehrle et al. |
| 2013/0280581 A1 | 10/2013 | Sun et al. |
| 2014/0106186 A1 | 4/2014 | Dudney et al. |
| 2014/0162132 A1 | 6/2014 | Ishii et al. |
| 2014/0212767 A1 | 7/2014 | Suzuki et al. |
| 2014/0272578 A1 | 9/2014 | Xiao et al. |
| 2015/0037660 A1 | 2/2015 | Bedjaoui et al. |
| 2015/0064537 A1 | 3/2015 | Christensen et al. |
| 2015/0086865 A1 | 3/2015 | Oda |
| 2015/0106769 A1 | 4/2015 | Yamazaki et al. |
| 2015/0140442 A1 | 5/2015 | Cyman et al. |
| 2015/0152549 A1 | 6/2015 | King et al. |
| 2015/0162606 A1 | 6/2015 | Kelder et al. |
| 2015/0171431 A1 | 6/2015 | Yamada et al. |
| 2015/0180023 A1 | 6/2015 | Xiao et al. |
| 2015/0194701 A1 | 7/2015 | Kim et al. |
| 2015/0225853 A1 | 8/2015 | Mantymaki et al. |
| 2015/0270532 A1 | 9/2015 | Sastry et al. |
| 2015/0357650 A1 | 12/2015 | Lakshmanan et al. |
| 2016/0351973 A1 | 12/2016 | Albano et al. |

FOREIGN PATENT DOCUMENTS

| | | |
|---|---|---|
| CN | 103078134 A | 5/2013 |
| CN | 104241614 A | 12/2014 |
| EP | 2 463 940 A1 | 6/2012 |
| EP | 3 304 635 A4 | 4/2018 |
| JP | 2008-103204 A | 5/2008 |
| JP | 2009-181901 A | 8/2009 |
| JP | 2012-094445 | 5/2012 |
| JP | 2012-160379 A | 8/2012 |
| JP | 2013-137947 A | 7/2013 |
| JP | 2013-143375 | 7/2013 |
| JP | 2014-041720 A | 3/2014 |
| JP | 2014-116111 A | 6/2014 |
| JP | 2014-170656 A | 9/2014 |
| JP | 2015-500558 A | 1/2015 |
| KR | 10-2007-0010961 A | 1/2007 |
| KR | 10-2013-0130862 A | 12/2013 |
| KR | 10-2014-0093529 A | 7/2014 |
| KR | 10-2014-0116274 A | 10/2014 |
| WO | WO-99/01902 A1 | 1/1999 |
| WO | WO-2011/098233 A2 | 8/2011 |
| WO | WO-2013/011297 A1 | 1/2013 |
| WO | WO-2015/030407 A1 | 3/2015 |
| WO | WO-2015/106769 A1 | 7/2015 |
| WO | WO-2015/153584 A1 | 10/2015 |
| WO | WO-2015/189284 A1 | 12/2015 |
| WO | WO-2015/197589 A1 | 12/2015 |
| WO | WO-2016/196688 A1 | 12/2016 |

OTHER PUBLICATIONS

Dongjoon et al, "Extended Lithium Titanate Cycling Potential Window with Near Zero Capacity Loss," Electrochemistry Communications 13 (2011), pp. 796-799.

Yoon Seok Jung et al, "Effects of Atomic Layer Deposition of $Al_2O_3$ on the $Li[Li_{0.20}Mn_{0.54}Ni_{0.13}]O_2$ Cathode for Lithium-Ion Batteries," Journal of the Electrochemical Society (2011), vol. 158, Issue 12, pp. A1298-A1302.

Kyu Tae Lee et al, "Roles of Surface Chemistry on Safety and Electrochemistry in Lithium Ion Batteries," Interdisciplinary School of Green Energy, Ulsan Nat'l Institute of Science and Technology (UNIST), Ulsan 689-798, Korea (2011).

Kevin Leung et al, "Using Atomic Layer Deposition to Hinder Solvent Decomposition in Lithium Ion Batteries: First-Principles Modeling and Experimental Studies," Journal of the American Chemical Society (2011).

Xingcheng Xiao et al, "Ultrathin Multifunctional Oxide Coatings for Lithium Ion Batteries," Advanced Materieals, (2011), vol. 23, pp. 3911-3915.

Meng-Lun Lee et al, Atomic Layer Deposition of $TiO_2$ on Negative Electrode for Lithium Ion Batteries,: Journal of Power Sources (2012), pp. 1-7.

Yoon Seok Jung et al, "Unexpected Improved Performance of ALD Coated $LiCoO_2$/Graphite Li-ion Batteries," Advanced Energy Materials, (2012).

Xiangbo Meng et al., "Emerging Applications of Atomic Layer Deposition for Lithium-Ion Battery Studies," Advanced Materials, (2012).

Hsin-Yi Wang et al, "Electrochemical Investigation of an Artificial Solid Electrolyte Interface for Improving the Cycle-ability of Lithium Ion Batteries using an Atomic Layer Deposition on a Graphite Electrode," Journal of Power Sources 233 (2013), pp. 1-5.

Jagjit Nanda, "Studies on Lithium Manganese Rich MNC Composite Cathodes," Oack Ridge National Laboratory, Project ID #ES106, May 16, 2013.

(56) References Cited

OTHER PUBLICATIONS

Xingcheng Xiao, "Atomic Layer Coating to Mitigate Capacity Fading Associated with Manganese Dissolution in Lithium Ion Batteries," Electrochemistry Communications 32 (2013), pp. 31-34.
Ji Woo Kim et al., "Unexpected High Power Performance of Atomic Layer Deposition Coated Li[$Ni_{1/3}Mn_{1/3}Co_{1/3}$])$_2$ Cathodes," Journal of Power Sources 254 (2014), pp. 190-197.
Feng Lin et al., "Chemical and Structural Stability of Lithium-Ion Battery Electrode Materials under Electron Beam," Scientific Reports, Jul. 16, 2014.
Jun Lu et al, "Effectively Suppressing Dissolution of Manganese from Spinel Lithium Manganate Via a Nanoscale Surface-doping Approach," Nature Communications, Dec. 16, 2014.
Juchuan Li et al, "Artificial Solid Electrolyte Interphase to Address the Electrochemical Degradation of Silicon Electrodes," Applied Materials & Interfaces, Jun. 13, 2014.
Yan Li et al, "Synthesis Characterization and Electrochemical Performance of $AlF_3$-coated $Li_{1.2}(Mn_{0.54}Ni_{0.16}Co_{0.08})O_2$ as Cathode for Li-ion Battery," Science Press, Trans. Nonferrous Met. Soc. China 24 (2014), pp. 3534-3540.
Hui Liu et al, "lithium-Rich $Li_{1.2}Ni_{0.13}Co_{0.13}Mn_{0.54}O_2$ Oxide Coated by $Li_3PO_4$ and Carbon Nanocomposite Layers as High Performance Cathode Materials for Lithium Ion Batteries," Journal of Materials Chemistry A (2015).
Jun Lu, "Effectively Suppressing Dissolution of Manganese from Spinel Lithium Manganate Via a Nanoscale Surface-doping Approach," Nature Communications, Dec. 16, 2014.
Ira Bloom, et al, "Effect of Interface Modifications on Voltage Fade in $0.5Li_2MnO_3$-$0.5LiNi_{0.375}Co_{0.25}$)$_2$ Cathode Materials," Journal of Power Sources 249 (2014) pp. 509-514.
Pilgun Oh, "Superior Long-Term Energy Retention and Volumetric Energy Density for Li-Rich Cathode Materials," Nano Letters (2014) pp. 5965-5972.
Daniela Molina Piper et al., "Reversible High-Capacity Si Nanocomposite Anodes for Lithium-ion Batteries Enabled by Molecular Layer Deposition," Advanced Materials (2014), pp. 1596-1601.
Raymond R. Unocic et al, "Direct Visualization of Solid Electrolyte Interphase Formation in Lithium-Ion Batteries with In Situ Electrochemical Transmission Electron Microscopy," Microscopy and Microanalysis (2014), pp. 1029-1037.
Jianming Zheng et al, "Mitigating Voltage Fade in Cathode Materials by Improving the Atonic Level Uniformity of Elemental Distribution," Nano Letters (2014), pp. 2628-2635.
Biwei Xiao et al, "Unravelling the Role of Electrochemically Active $FePO_4$ Coating by Atomic Layer Deposition for Increased High-Voltage Stability of $LiNi0.5Mn1O4$ Cathode Material," Adv. Sci. (2015) p. 1500022-1500027.
Chunmei Ban et al, "Atomic layer deposition of amorphous $TiO_2$ on graphene as an anode for Li-ion batteries," Nanotechnology 24 (2013)424002, 6 pages.
Eunae Kang et al, "$Fe_3O_4$ Nanoparticles Confined in Mesocellular Carbon Foam for High Performance Anode materials for Lithium-Ion Batteries," Advanced Functional Materials (2011), vol. 21, p. 2430-2438.
Hyea Kim et al, "Plasma-enhanced Atomic Layer Deposition of Ultrathin Oxide Coatings for Stabilized Lithium-Sulfur Batteries," Advanced Energy materials (2013), vol. 3, p. 1308-1315.
Hyung-Man Cho et al., "Effect of Surface Modification on Nano-Structured $LiNi0.5Mn1.5O4$ Spinel Materials," ACS Apl. Mater. Interfaces (2015), p. A-I (9 pages).
Indranil Lahiri et al, "Ultrathin alumina-coated carbon nanotubes as an anode for high capacity Li-Ion batteries," Journal of Materials Chemistry (2011), vol. 21, p. 13621-13626.
Jian-Hong Lee et al, "the effect of $TiO_2$ coating on the electrochemical performance of ZnO nanorod as the anode material for lithium-ion battery," Appl. Phys. A. (2011), vol. 102, p. 545-550.
Jianqing Zhao et al, "Atomic layer deposition of epitaxial $ZrO_2$ coating on $LiMn2O4$ nanopoarticles for high-rate lithium ion batteries at elevated temperature," Nano Energy (2013) vol. 2, p. 882-889.

Juan Liu et al, "Rational Design of Atomic-Layer-Deposited $LiFePO_4$ as a High-Performance Cathode for Lithium-Ion Batteries," Advanced Materials, vol. 26, No. 37, Oct. 8, 2014, p. 6472-6477.
Juan Liu et al, "Ultrathin atomic layer deposited $ZrO_2$ coating to enhance the electrochemical performance of $Li4Ti5O12$ as an anode material," Electrochimica Acta 93 (2013, p. 195-201).
Leah A. Riley et al. "Electrochemical effects of ALD surface modification on combustion synthesized $LiNi1/3Mn1/3O2$ as a layered-cathode material," Journal of Power Sources 196 (2011)p. 3317-3324.
Nulati Yesibolati et al, "$SnO_2$ Anode Surface Passivation by Atomic Layer Deposited $HfO_2$ Improves Li-Ion Battery Performance," Small (2014), vol. 10, No. 14, p. 2849-2858.
Qi-Hui Wu et al, "An Alumina-Coated $Fe_3O_4$-Reduced Graphene Oxide Composite Electrode as a Stable Anode for Lithium-ion Battery," Electrochimica Acta 156 (2015), p. 147-153.
Renske Beetstra et al, "Improved Li-ion Battery Performance by Coating Cathode Nano-Particles Using Atomic Layer Deposition," Refereed Proceedings of the 12th International Conference on Fluidization—New Horizons in Fluidization Engineering (2007) p. 368-376.
V. Aravindan et al, "Atomic layer deposited (ALD) $SnO_2$ anodes with exceptional cycleability for Li-ion batteries," Nano Energy (2013), http://dx.dio.org/10.1016/j.nanoen.2012.12.007.
Xiaogang Han et al, Atomic-Layer-Deposition Oxide Nanoglue for Sodium Ion Batteries,: Nano Letters (2014), vol. 14, p. 139-147 (29 pages).
Xifei Li et al, "Significant impact on cathode performance lithium-ion batteries by precisely controlled metal oxide nanocoatings via atomic layer deposition," Journal of Power Sources 247 (2014), p. 57-69.
Yoon S. Jung et al, "Enhanced Stability of $LiCoO_2$ Cathodes in Lithium-Ion Batteries Using Surface Modification by Atomic Layer Deposition," Journal of the Electrochemical Society (2010), vol. 157, p. A75-A81.
Yoon S. Jung et al, "Enhanced Stability of $LiCoO_2$ Cathodes in Lithium-ion Batteries Using Surface Modification by Atomic Layer Deposition," Journal of the Korean Ceramic Society (2010), vol. 47, No. 1, p. 61-65.
Yoon Seok Jung et al, "Ultrathin Direct Atomic Layer Deposition on Composite Electrodes for Highly Durable and Safe Li-Ion Batteries," Advanced materials (2010), vol. 22, p. 2172-2176.
Yu He et al, "Alumina-Coated Patterned Amorphous Silicon as the Anode for a Lithium-Ion Battery with High Coulombic Efficiency," Advanced Materials (2011), vol. 23, p. 4938-4941.
U.S. Appl. No. 15/167,453.
U.S. Appl. No. 15/170,374.
Office Action from European Application EP 16 804 367.7 dated Jun. 10, 2021.
Office Action from Australian Application AU 2019240681 dated Nov. 11, 2020.
Office Action from Canadian Application CA 2987938 dated Jul. 30, 2021.
3rd Office Action from Chinese Application CN 201680032297.7 dated Jul. 13, 2021.
Translation of 3rd Office Action from Chinese Application CN 201680032297.7 dated Jul. 13, 2021.
Second Office Action from Korean Application KR 10-2020-7002674 dated Nov. 23, 2020.
Translation of Second Office Action from Korean Application KR 10-2020-7002674 dated Nov. 23, 2020.
Third Office Action from Korean Application KR 10-2020-7002674 dated Feb. 2, 2021.
Translation of Third Office Action from Korean Application KR 10-2020-7002674 dated dated Feb. 2, 2021.
Fourth Office Action for Japanese Patent Application No. JP 2017-562061, dated Apr. 6, 2021.
Translation of Fourth Office Action for Japanese Patent Application No. JP 2017-562061, dated Apr. 6, 2021.
Machine translation of Description of CN 102244231 A.
Machine translation of Description of CN 104241614.
Machine translation of Description of CN 103078134 A.

(56) References Cited

OTHER PUBLICATIONS

Third Office Action from Canadian Application No. CA 2987938 dated Mar. 3, 2022.
First Office Action in Korean Application No. 10-2022-7040748 dated Jan. 3, 2023.
Translation of First Office Action in Korean Application No. 10-2022-7040748 dated Jan. 3, 2023.
Second Office Action in Korean Application No. 10-2022-7040748 dated Nov. 27, 2023.
Translation of Second Office Action in Korean Application No. 10-2022-7040748 dated Nov. 27, 2023.
Kong, J. C. et al. "Ultrathin ZnO coating for improved electrochemical performance of LiNi0.5Co0.2Mn0.3O2 cathode material", Journal of Power Sources 266 (2014), pp. 433-439.
Translation of KR 10-2007-0010961 A.
Office Action in Australian Patent Application No. 2022201282 dated Apr. 16, 2024.

* cited by examiner

NANO-ENGINEERED COATINGS FOR ANODE ACTIVE MATERIALS, CATHODE ACTIVE MATERIALS, AND SOLID-STATE ELECTROLYTES AND METHODS OF MAKING BATTERIES CONTAINING NANO-ENGINEERED COATINGS

TECHNICAL FIELD

Embodiments of the present disclosure relate generally to electrochemical cells. Particularly, embodiments of the present disclosure relate to batteries having nano-engineered coatings on certain of their constituent materials. More particularly, embodiments of the present disclosure relate nano-engineered coatings for anode active materials, cathode active materials, and solid state electrolytes, and methods of manufacturing batteries containing these coatings.

BACKGROUND

Modern batteries suffer from various phenomena that may degrade performance. Degradation may affect resistance, the amount of charge-storing ions, the number of ion-storage sites in electrodes, the nature of ion-storage sites in electrodes, the amount of electrolyte, and, ultimately, the battery's capacity, power, and voltage. Components of resistance may be gas formation pockets between layers (i.e., delamination), lack of charge-storing ion salt in electrolyte, reduced amount of electrolyte components (i.e., dryout), electrode mechanical degradation, cathode solid-electrolyte-interphase (SEI) or surface phase transformation, and anode SEI.

Liquid-electrolyte batteries may be made by forming electrodes by applying a slurry of active material on a current collector, forming two electrodes of opposite polarity. The cell may be formed as a sandwich of separator and electrolyte disposed between the two electrodes of opposite polarity. A cathode may be formed by coating an aluminum current collector with active material. An anode may be formed by coating a copper current collector with active material. Typically, the active material particles are not coated before the slurry is applied to the current collectors to form the electrodes. Variations may include mono-polar, bi-polar, and pseudo-bi-polar geometries.

Solid-state electrolyte batteries may be made by building up layers of materials sequentially. For example, a current collector layer may be deposited, followed by depositing a cathode layer, followed by depositing a solid-state electrolyte layer, followed by depositing an anode layer, followed by depositing a current collector layer, followed by encapsulation of the cell assembly. Again, the active materials are not typically coated before depositing the various layers. Coating of active materials and solid state electrolyte is not suggested or taught in the art. Rather, persons of ordinary skill strive to reduce internal resistance and would understand that coating active materials or solid-state electrolyte would tend to increase resistance and would have been thought to be counterproductive.

As with liquid-electrolyte batteries, variations may include mono-polar, bi-polar, and pseudo-bi-polar geometries.

In either a liquid-electrolyte or solid-electrolyte configuration, various side-reactions may increase the resistance of the materials. For example, when the materials are exposed to air or oxygen, they may oxidize, creating areas of higher resistance. These areas of higher resistance may migrate through the materials, increasing resistance and reducing capacity and reducing cycle life of the battery.

In the positive electrode, diffusion polarization barriers may form as a result of these oxidation reactions. Similarly, in the electrolyte, diffusion polarization barriers may form. In the negative electrode, solid-electrolyte-interphase (SEI) layers may form. For ease of reference in this disclosure, "diffusion polarization barriers," "concentration polarization layers," and "solid-electrolyte interphase layers," are referred to as "solid-electrolyte interphase" or "SEI" layers.

SEI layers form due to electrochemical reaction of the electrode surface, namely, oxidation at the cathode and reduction at the anode. The electrolyte participates in these side-reactions by providing various chemical species to facilitate these side reactions, mainly, hydrogen, carbon, and fluorine, among other chemical species. This may result in the evolution of oxygen, carbon dioxide, hydrogen fluoride, manganese, lithium-ion, lithium-hydroxide, lithium-dihydroxide, and lithium carboxylate, and other undesirable lithium species, among other reaction products. Various electrochemistries may be affected by these side-reaction, including lithium-ion, sodium-ion, magnesium-ion, lithium-sulfur, lithium-titanate, solid state lithium, and solid state batteries comprising other electrochemistries. These side reactions result in thickening of the SEI layer over time, and during cycling. These side reactions may result in resistance growth, capacity fade, power fade, and voltage fade over cycle life.

Three mechanisms are known to be responsible for these oxidation reactions. First, various reactions occur in the liquid of the electrolyte. A variety of salts and additives are typically used in electrolyte formulation. Each is capable of decomposing and providing species that may contribute to SEI layer formation and growth. For example, the electrolyte may include lithium hexafluoride ($LiPF_6$).

In particular, the reduction of LiPF6, into a strong Lewis acid $PF_5$, fosters a ring-opening reaction with the ethylene carbonate solvent of the electrolyte (EC) and contaminates the anode active material surface in the presence of the Li+ ions. It also initiates the formation of insoluble organic and inorganic lithium species on the surface of the electrode (good SEI layer). A good SEI layer is a Li+ ion conductor but an insulator to electron flow. A robust SEI layer prevents further electrolyte solvent reduction on the negative electrode. However, the metastable species $ROCO_2Li$ within the SEI layer can decompose into more stable compounds —$Li_2CO_3$ and LiF at elevated temperature or in the presence of catalytic compounds, e.g. $Ni_2+$ or $Mn_2+$ ions. These products of side reactions are porous and expose the negative active material surface to more electrolyte decomposition reactions, which promote the formation of a variety of layers on the electrode surface. These layers lead to the loss/consumption of lithium ions at electrode/electrolyte interface and are one of the major causes of irreversible capacity and power fade.

Typical liquid electrolyte formulations contain ethylene carbonate (EC), diethyl carbonate (DEC), and dimethyl carbonate (DMC) solvents. EC is highly reactive and easily undergoes a one electron reduction reaction at the anode surface. The EC molecule is preferably reacted (solvation reaction) because of its high dielectric constant and polarity compared to other solvent molecules. The electrolyte decomposition is initiated during the intercalation of Li+ into the negative active materials particles. An electron is transferred from the electrode to the electrolyte salt (LiPF6 typically) to initiate an autocatalytic process that produces Lewis acid and lithium fluoride as shown in Equation 1. The Lewis acid $PF_5$ reacts further with impurities of water or alcohols (Eq. 2 and 3) in the electrolyte to produce HF and $POF_3$:

$$LiPF_6 \leftrightarrow LiF+PF_5 \quad (1)$$

$$PF_5+H_2O \leftrightarrow PF_5+{^-}OH_2 \quad (2)$$

$$PF_5+H_2O \leftrightarrow 2HF+POF_3 \quad (3)$$

Various other components of the electrolyte may undergo similar processes by interacting with the active materials and produce more fluorinated compounds and $CO_2$. At high state of charge (high voltage) or when higher voltage materials are used in the manufacture of the battery electrodes, e.g., nickel-rich compounds, the decomposition reactions are even more electrochemically favored.

Second, reactions may occur on the surface of the active material. The surface of the active material may be nickel-rich or enriched with other transition metals and nickel may provide catalytic activity that may initiate, encourage, foster, or promote various side reactions. Side reactions at the surface of the active material may include oxidation at the cathode, reduction at the anode, and phase transformation reactions that initiate at the surface and proceed through the bulk of the active material. For example, the cathode active material may include nickel-manganese-cobalt-oxide (NMC). NMC may undergo a phase transition at the surface to form nickel-oxide or a spinel form of lithium-manganese-oxide. This may result in the evolution of $CO_2$, $MN_2^+$, HF, and various oxidized species. These may form an SEI on the anode surface.

In addition, less space is available in the remaining modified crystal structures on the cathode surface of the active material to accommodate lithium ions in the crystal lattice. This reduces capacity. These phases may also have lower intercalation voltage than the original structure, leading to voltage fade. The more these secondary phases occur, the greater the reduction in capacity for storing lithium ions and voltage fade. These changes are irreversible. Thus, capacity lost to these side reactions cannot be recovered on cycling the battery.

Third, bulk transition of NMC to spinel also reduces capacity and voltage. These reactions may initiate at the surface and proceed through the bulk material. These spinel transition reactions do not rely on electrolyte decomposition or oxidation-reduction reactions. Rather, spinel is a more stable crystalline form having a lower energy state and its formation is thermodynamically favored.

These SEI reactions can increase resistance due to increased thickness of a passivation layer on the active materials and/or electrodes that accumulates and grow thicker over time. Concentration gradients may form in the SEI. Electrolyte may become depleted in certain ionic species. Other elements, including, manganese, may be degraded at the anode side of the reaction, slowing lithium diffusion and increasing ionic transfer resistance.

Some past efforts have applied material layers to the anode or cathode of a battery by atomic layered deposition (ALD) to improve electrical conductivity of the active materials. See, for example, Amine, et al., U.S. Pat. No. 9,005,816 for "Coating of Porous Carbon for Use in Lithium Air Batteries," which is incorporated herein by reference in its entirety. Amine deposits carbon to enhance conductivity.

One shortcoming of this approach is that the chemical pathways at the cathode and/or anode surface of the above side reactions remain unaltered. Amine's coating is not engineered. Rather, whatever material is thermodynamically-favored is formed. The active materials are ceramic oxides that are not highly-electrically conductive. Amine deposits carbon, not to block side reactions but, rather, to promote electrical conductivity. Depositing a conductive material may enhance the charge rate but may not block these side reactions. Particularly in view of the fact that Amine's coating is electrically conductive and porous, the above side reaction mechanisms may continue to operate.

SUMMARY

Although the present disclosure is not limited to this theory, the present inventors believe that altering the interface to reduce contact transfer, ionic transfer resistance, and concentration polarization resistance transfer may alter the behavior of the SEI layer to reduce the above-noted components that would otherwise increase resistance. The present inventors believe that it is desirable to inhibit undesirable chemical pathways and mitigate side reactions. By altering the behavior of the SEI interphase and tailoring and adapting its composition to reduce contact transfer or concentration polarization resistance, cycle life of high energy density materials may be improved and power fade and resistance growth reduced. Preferred embodiments of the present invention deposit a coating on anode active materials, cathode active materials, or solid state electrolyte. This coating is preferably mechanically stable during repeated cycling of the battery, thin, continuous, and non-porous. The coating may be electrically conductive or non-conductive.

In various embodiments, a cathode, anode, or solid state electrolyte material is coated with a nano-engineered coating, preferably by one or more of: atomic layer deposition; molecular layer deposition; chemical vapor deposition; physical vapor deposition; vacuum deposition; electron beam deposition; laser deposition; plasma deposition; radio frequency sputtering; sol-gel, microemulsion, successive ionic layer deposition, aqueous deposition; mechanofusion; solid-state diffusion, or doping. The nano-engineered coating material may be a stable and ionically-conductive material selected from a group including any one or more of the following: (i) metal oxide; (ii) metal halide; (iii) metal oxyflouride; (iv) metal phosphate; (v) metal sulfate; (vi) non-metal oxide, (vii) olivines, (viii) NaSICON structures, (ix) perovskite structures, (x) spinel structures, (xi) polymetallic ionic structures, (xii) metal organic structures or complexes, (xiii) polymetallic organic structures or complexes, (xiv) structures with periodic properties, (xv) functional groups that are randomly distributed, (xvi) functional groups that are periodically distributed, (xvii) block copolymers; (xviii) functional groups that have checkered microstructure, (xix) functionally graded materials; (xx) 2D periodic microstructures, and (xxi) 3D periodic microstructures. Suitable metals may be selected from, but not limited to, the following: alkali metals, transition metals, lanthanum, boron, silicon, carbon, tin, germanium, gallium, aluminum, and indium. Suitable coatings may contain one or more of the above materials.

Embodiments of the present disclosure include methods of depositing a nano-engineered coating on cathode active materials, anode active materials, or solid state electrolyte using one or more of these techniques. In a preferred embodiment, a coating is deposited on cathode material particles before they are mixed into a slurry to form active material that is applied to the current collector to form an electrode. The coating is preferably mechanically-stable, thin, conformal, continuous, non-porous, and ionically conductive. A battery may be made using a cathode active material coated in this manner, an anode, and a liquid electrolyte.

In certain embodiments, a battery includes: an anode; a cathode; and either a liquid or solid-state electrolyte configured to provide ionic transfer between the anode and the cathode; with a microscopic coating deposited either on the solid-state electrolyte, or on the anode or cathode active material regardless whether a solid-state or liquid electrolyte is used.

Certain embodiments of the present disclosure teach nano-engineered coatings for use in a battery to inhibit undesirable side-reactions. Additionally, embodiments of the present disclosure may inhibit undesirable structural changes resulting from side reactions of the electrolyte or solid state reactions of the active materials, e.g., phase transitions. Batteries of embodiments of the present disclosure may yield increased capacity and increased cycle life.

Certain embodiments of the present disclosure provide nano-engineered coating techniques that are less expensive alternatives to existing designs. These techniques may be relatively faster and require less stringent manufacturing environments, e.g., coatings can be applied in a vacuum or outside of a vacuum and at varying temperatures.

Another advantage of certain embodiments of the present disclosure is reduced cell resistance and increased cycle life. Certain embodiments of the present disclosure yield higher capacity and greater material selection flexibility. Certain embodiments of the present disclosure offer increased uniformity and controllability in coating application.

Additional advantages of the disclosure will be set forth in part in the description which follows, and in part will be apparent from the description, or may be learned by practice of the disclosure. The advantages of the disclosure will be realized and attained by means of the elements and combinations particularly pointed out in the appended claims.

It is to be understood that both the foregoing general description and the following detailed description are exemplary and explanatory only and are not restrictive of the invention, as claimed.

The accompanying drawings, which are incorporated in and constitute a part of this specification, illustrate one or more exemplary embodiments of the disclosure and together with the description, serve to exemplify the principles of the disclosure.

The following detailed description refers to the accompanying drawings. Wherever possible, the same reference numbers may be used in the drawings and the following description to refer to the same or similar parts. Details are set forth to aid in understanding the embodiments described herein. In some cases, embodiments may be practiced without these details. In others, well-known techniques and/or components may not be described in detail to avoid complicating the description. While several exemplary embodiments and features are described herein, modifications, adaptations and other implementations are possible without departing from the spirit and scope of the invention as claimed. The following detailed description does not limit the invention. Instead, the proper scope of the invention is defined by the appended claims.

BRIEF DESCRIPTION OF THE DRAWINGS

FIG. 4A depicts the uncoated particle before cycling. FIG. 4B depicts the uncoated particle after cycling. A comparison of the images reflects that the surface of the uncoated material at the end of life is corroded and pitted and that the lattice has been disrupted relative to the nano-engineered coated material.

FIG. 6A depicts the particle before cycling. The yellow arrows indicate a reciprocal lattice, depicting the actual locations of the atoms in the lattice. FIG. 6B depicts a particle of the same material after cycling, showing that the positions of the atoms have been altered.

FIG. 7A depicts the coated particle before cycling. FIG. 7B depicts the coated particle after cycling.

FIG. 9A is a graph of cycle number vs discharge capacity for a non-gradient HV NMC cathode and graphite anode, cycled under a 1C/1C rate between 4.2 V and 2.7 V. The line labelled A reflects that capacity has fallen to 80% within 200 cycles for the uncoated active material. FIG. 9B depicts cycle number vs. Discharge capacity for gradient cathode and Si-anode (B) and for mixed cathode (c), depicting that capacity of both has fallen to 80% within 150 cycles.

DETAILED DESCRIPTION

Embodiments of the present disclosure comprise nano-engineered coatings (microscopic material layers) applied to cathode active materials, anode active materials, or solid-state electrolyte materials of batteries. Nano-engineered coatings of embodiments of the present disclosure may inhibit undesirable chemical pathways and side reactions. Nano-engineered coatings of embodiments of the present disclosure may be applied by different methods, may include different materials, and may comprise different material properties, representative examples of which are presented in the present disclosure.

Figure 1:
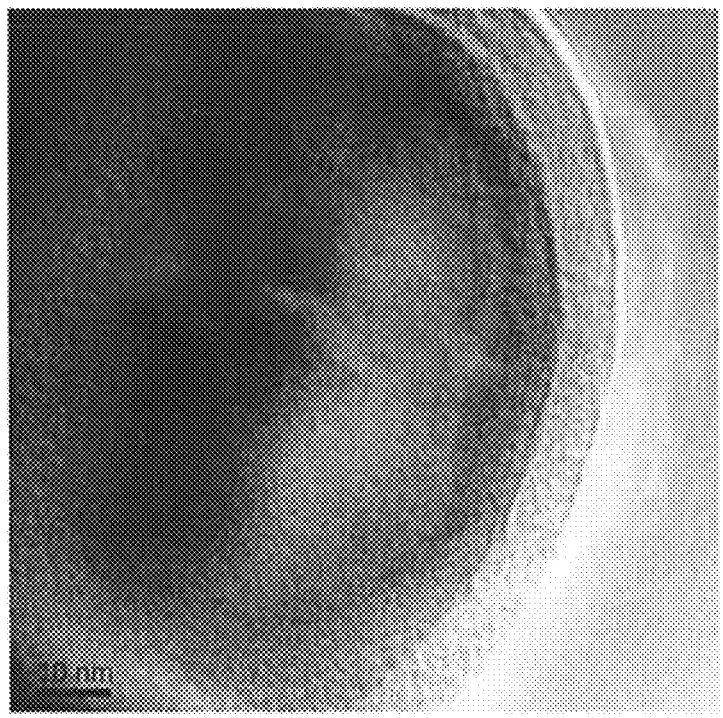
FIG. 1 is a transmission electron micrograph of a cathode material particle coated with a nano-engineered coating of a preferred embodiment of the present disclosure, depicting a uniform, conforming, continuous, nano-engineered coating layer.

FIG. 1 depicts a particle 10 of a cathode active material of a preferred embodiment of the present disclosure, with nano-engineered coating 20 deposited on the surface 30 of particle 10.

Figure 2:
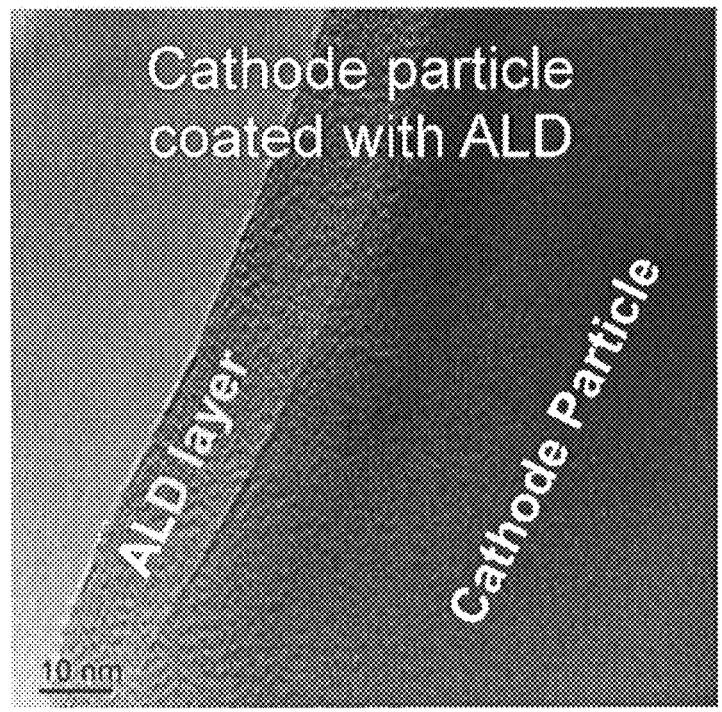
FIG. 2. is a higher magnification image of the particle depicted in FIG. 1.

FIG. 2 depicts an enlarged portion of an exemplary coated particle 10 of a preferred embodiment of the present disclosure depicted in FIG. 1, showing in greater detail, cathode particle 10 and nano-engineered coating 20 applied to surface 30 by atomic layer deposition. The nano-engineered coating 20 depicted in FIG. 2, preferably forms a thin, uniform, continuous, mechanically-stable coating layer, that conforms to surface 30 of particle 10.

In a preferred embodiment of the present disclosure, surface 30 of particles of cathode active material 10 precursor material are coated with nano-engineered coating 20. Coated particles of the precursor material are then mixed and formed into a slurry. The slurry is applied as active material onto a current collector, forming an electrode. Positive and negative electrode pairs are formed as anodes 140 and cathodes 150 and assembled into battery 100. Battery 100 comprises separator 170 and electrolyte 160 sandwiched between anode 140 and cathode 150 pairs, forming electrochemical cells. The individual electrochemical cells may be connected by a bus bar 180 in series or parallel, as desired, to build voltage or capacity, and disposed in casing 110, with positive and negative terminals, 120 and 130.

Figure 3:
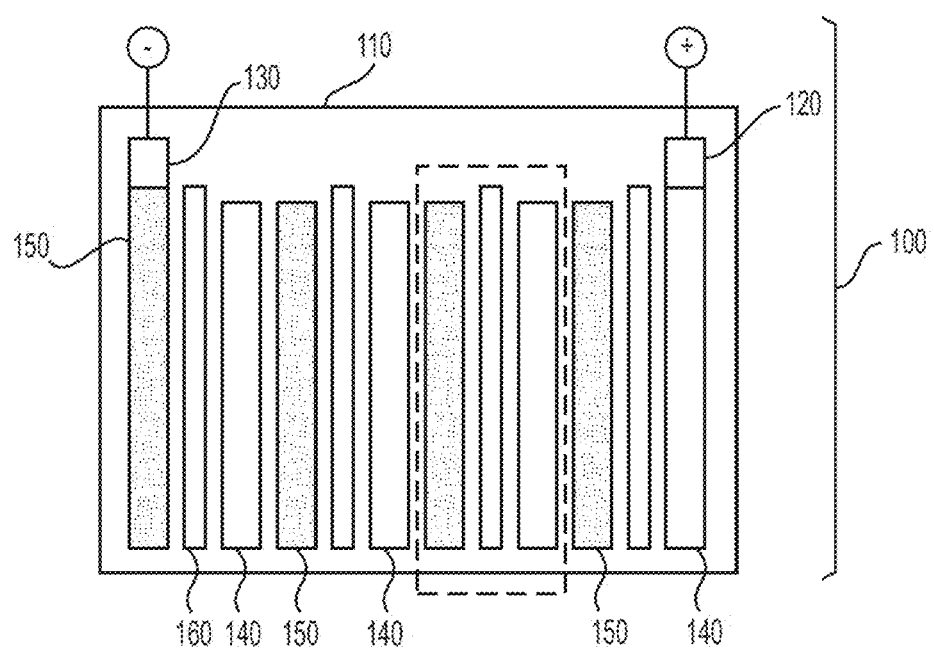
FIG. 3 is a schematic depiction of certain components of a battery of certain embodiments of the present disclosure.

FIG. 3 is a schematic representation of battery 100 of an alternative embodiment of the present disclosure Battery 100 may be a Li-ion battery. In other embodiments battery 100 may have a different electrochemistry. Battery 100 typically includes casing 110, having positive and negative terminals, 120 and 130, respectively. Within casing 110 are disposed a series of anodes 140 and cathodes 150. Anode 140 may comprise graphite. In alternative embodiments, anode 140 may have a different material composition.

Battery 100 may use either a liquid or solid state electrolyte. As depicted in FIG. 3, battery 100 uses solid-state electrolyte 160. Solid-state electrolyte 160 is disposed between anode 140 and cathode 150 to enable ionic transfer between anode 130 and cathode 140. As depicted in FIG. 3, electrolyte 160 may comprise a ceramic solid-state electrolyte material. In other embodiments, electrolyte 160 may comprise other suitable electrolyte materials that support ionic transfer between anode 140 and cathode 150.

Figure 4A:
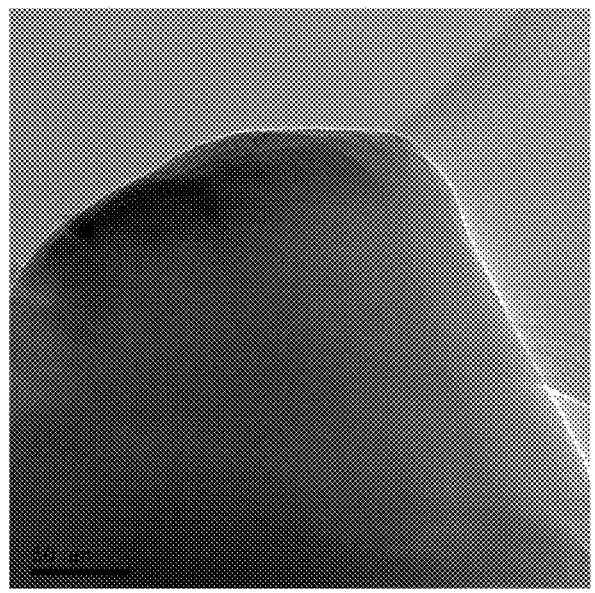
FIGS. 4A and 4B depict an uncoated particle before and after cycling.
Figure 4B:
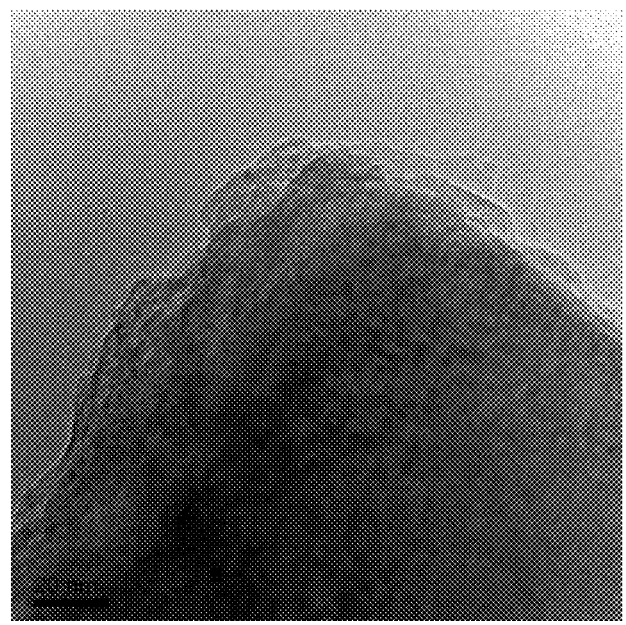
Figure 5A:
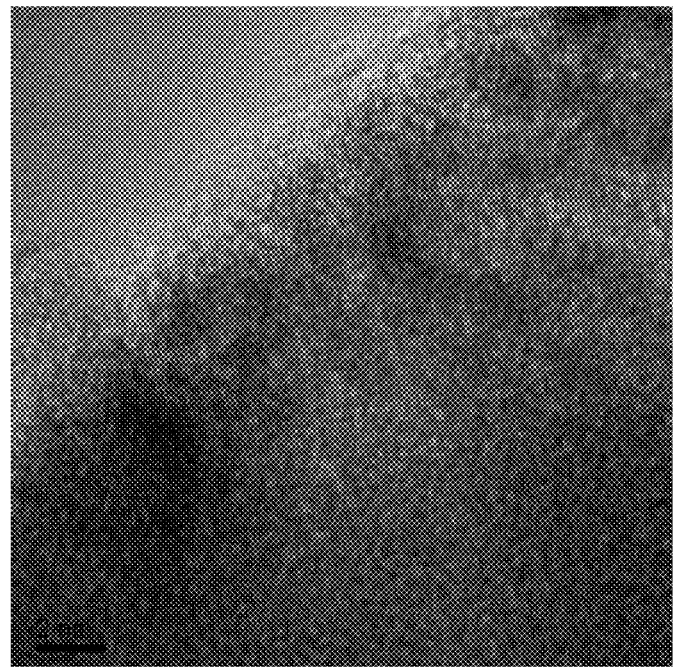
FIGS. 5A and 5B depict higher magnification images of the images shown in FIGS. 4A and 4B, showing increased corrosion of the surface (4A) and disruption of the lattice (4B) in the uncoated image.
Figure 5B:
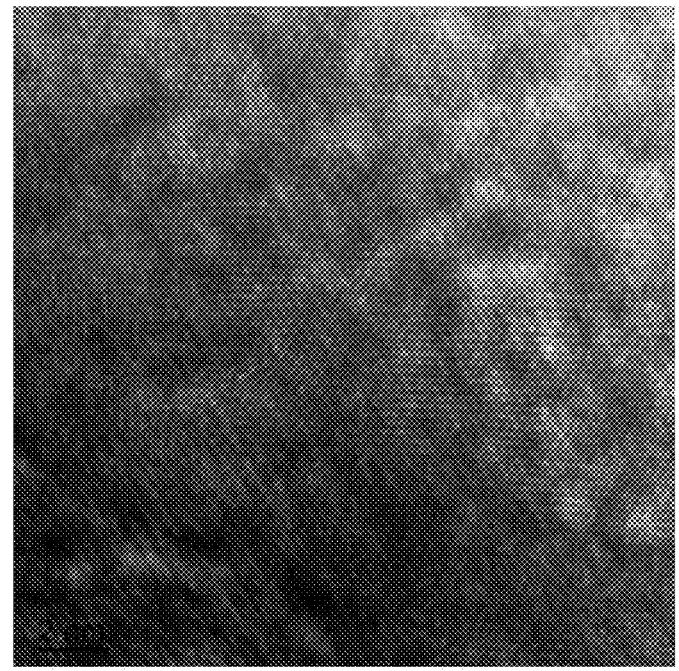

FIGS. 4A and 4B depict an uncoated cathode active material particle 10, before and after cycling. As depicted in FIG. 4A, the surface of the cathode particle before cycling is relatively smooth and continuous. FIG. 4B depicts the uncoated particle 10, after cycling, exhibiting substantial corrosion resulting in pitting and an irregular surface contour. FIGS. 5A and 5B depict higher magnification views of particles such as those depicted in FIGS. 4A and 4B, showing the more irregular surface following corrosion of uncoated particle 10 as a result of cycling.

Figure 6A:
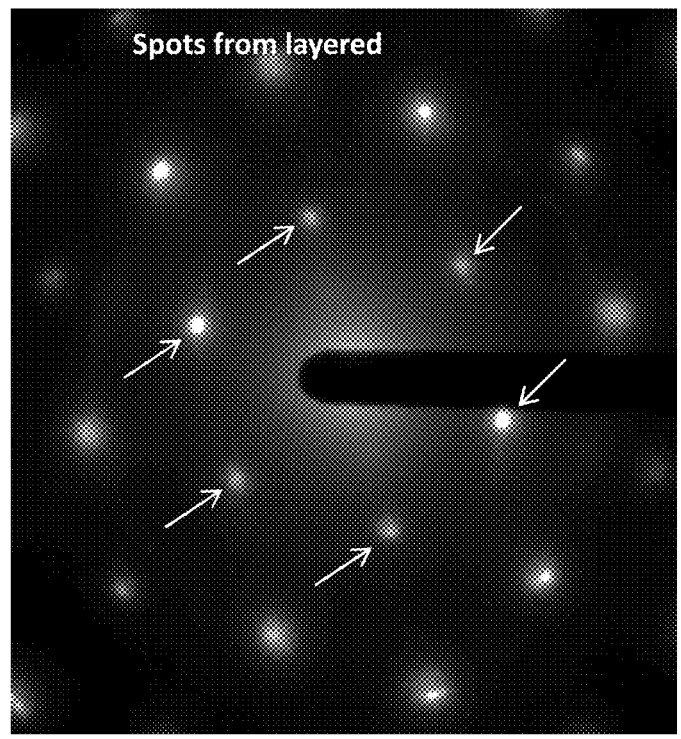
FIGS. 6A and 6B are representations of the reciprocal lattice by Fourier transform, depicting undesirable changes in the bulk material.
Figure 6B:
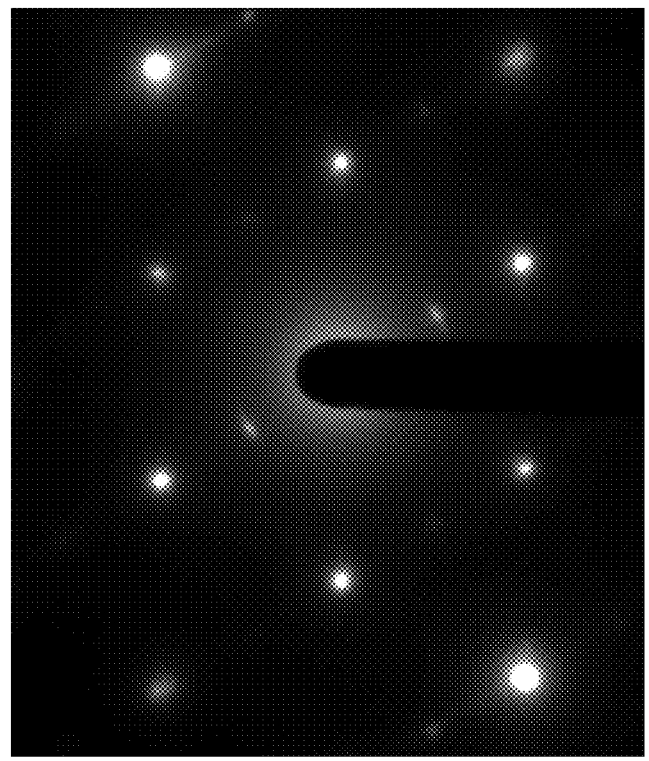

FIGS. 6A and 6B depict the dislocation of atoms in uncoated particle 10. Specifically, FIGS. 6A and 6B are representations of the reciprocal lattice. The reciprocal lattice is calculated by Fourier transform of the TEM image data to depict the positions of individual atoms in uncoated particle 10. FIG. 6A depicts the positions of atoms in an uncoated particle 10, before cycling. FIG. 6B depicts the positions of atoms in uncoated particle 10, after cycling. Comparing the atomic positions before and after cycling reveals undesirable changes in the atomic structure of the uncoated particle 10. The yellow arrows in FIG. 6A indicate a reciprocal lattice, depicting the actual locations of the atoms in the lattice. FIG. 6B depicts a particle of the same material after cycling, showing that the positions of the atoms have changed.

Figure 7A:
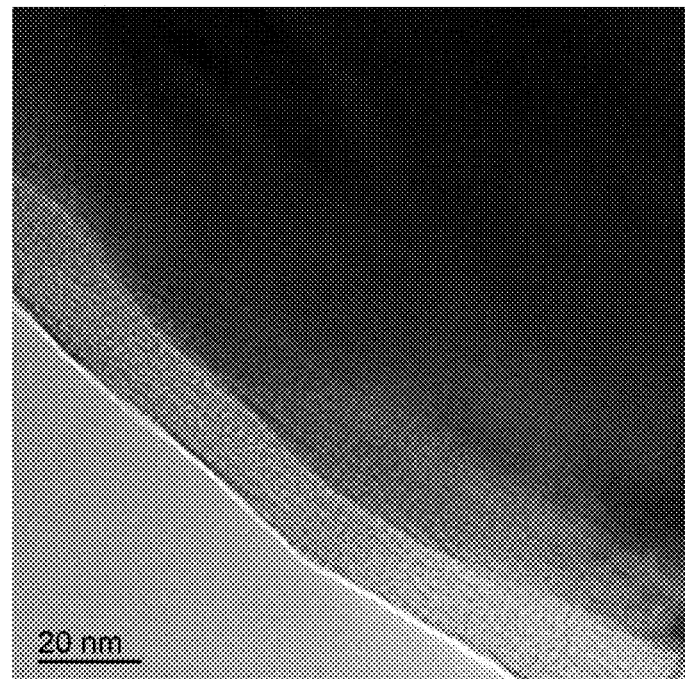
FIGS. 7A and 7B depict a coated particle of an embodiment of the present disclosure before and after cycling, showing that the surface of the coated particle at the end of life has resisted corrosion and pitting and that the lattice has not been disrupted.
Figure 7B:
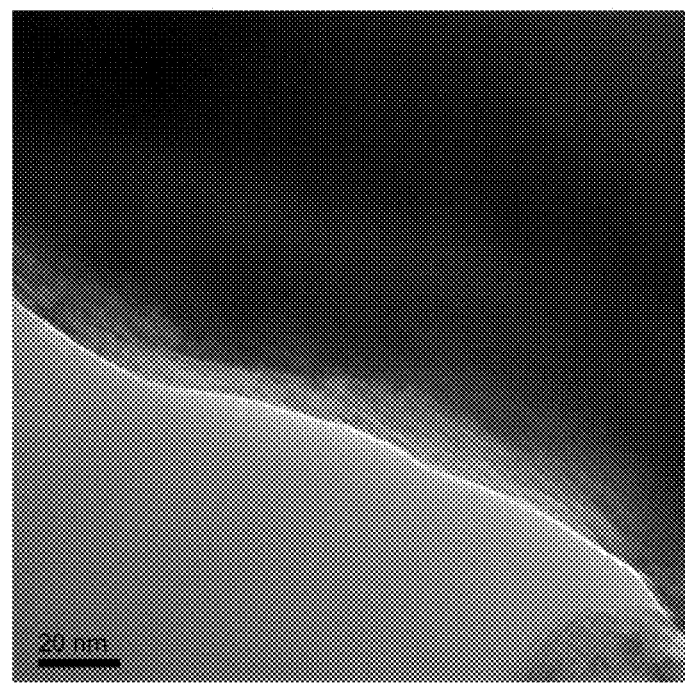

FIGS. 7A and 7B depict a coated particle 10 of an embodiment of the present disclosure before and after cycling. FIG. 7A depicts the coated particle 10, before cycling. FIG. 7B depicts coated particle 10, at the end of cycle life of battery 100. Comparison of FIGS. 7A and 7B relative to FIGS. 4A and 4B shows that the surface of coated particle 10 at the end of life has resisted corrosion and pitting and that the atomic lattice has not been disrupted as in uncoated particle.

Figure 8A:
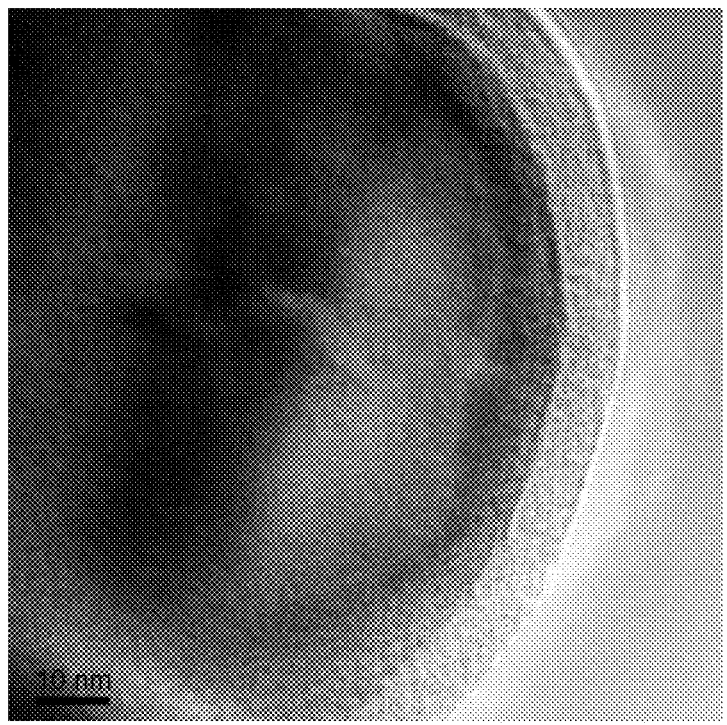
FIGS. 8A and 8B are additional images of the materials shown in FIGS. 7A and 7B. These images depict that the coating and lattice of the coated particle of an embodiment of the present disclosure are substantially intact and that the coating has resisted corrosion and disruption of the lattice and that the surface properties have been substantially preserved.
Figure 8B:
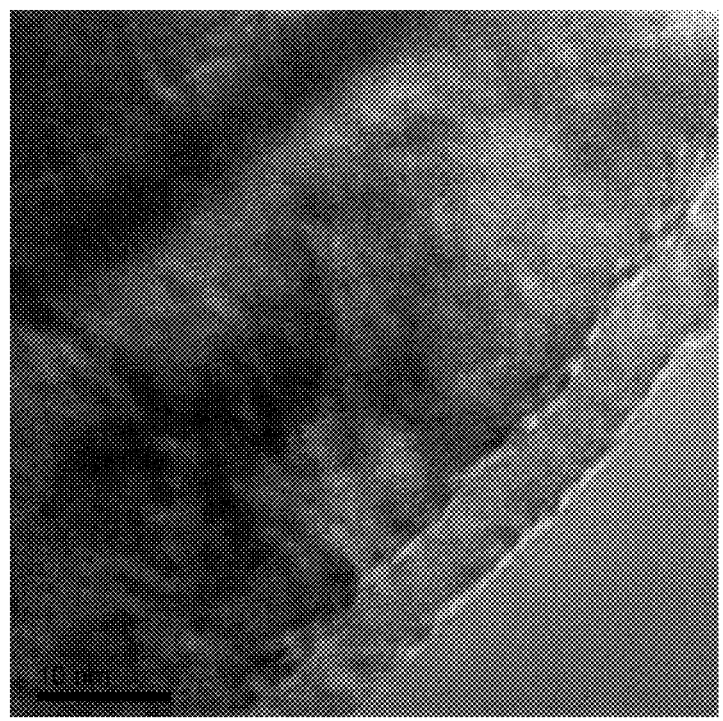

FIGS. 8A and 8B are additional images depicting coated particle 10, before and after cycling. The coating and lattice of the coated particle 10 of an embodiment of the present disclosure are substantially intact and that the coating has resisted corrosion and disruption of the lattice. The surface properties of coated particle 10 have been substantially preserved.

Figure 9A:
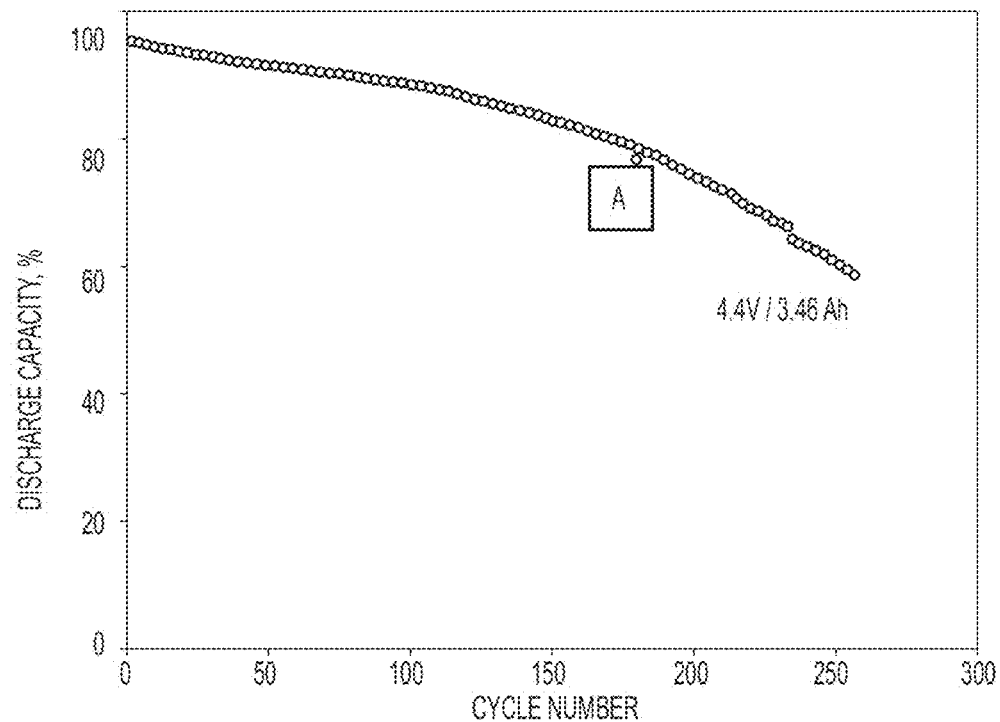
FIGS. 9A and 9B are graphs of cycle number vs discharge capacity for Li-ion batteries using uncoated active materials or solid-state electrolyte.
Figure 9B:
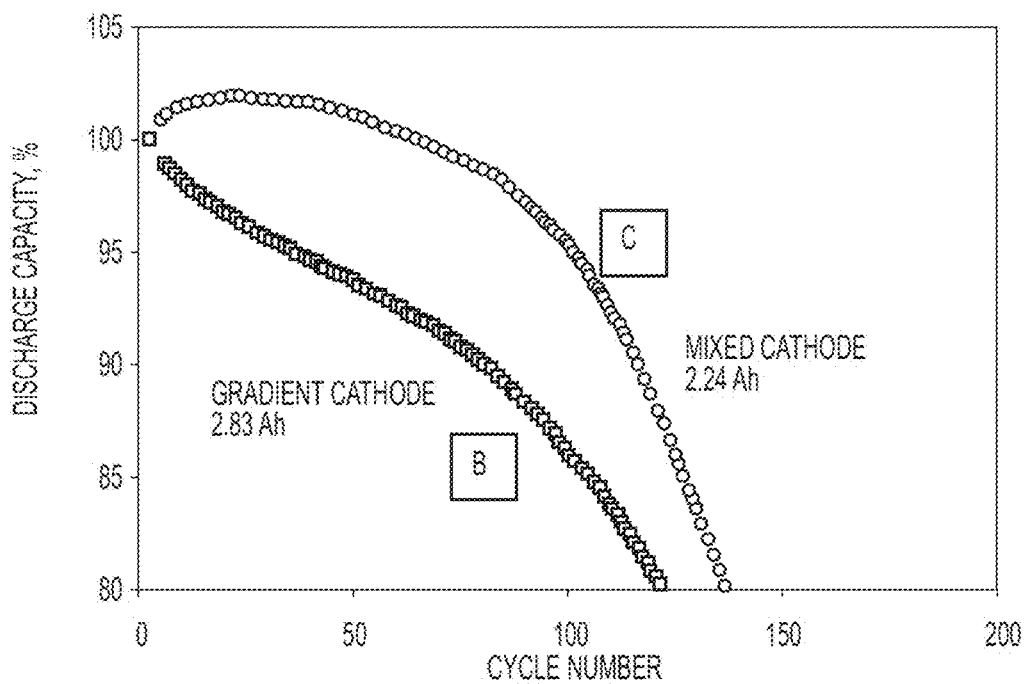
Figure 9C:
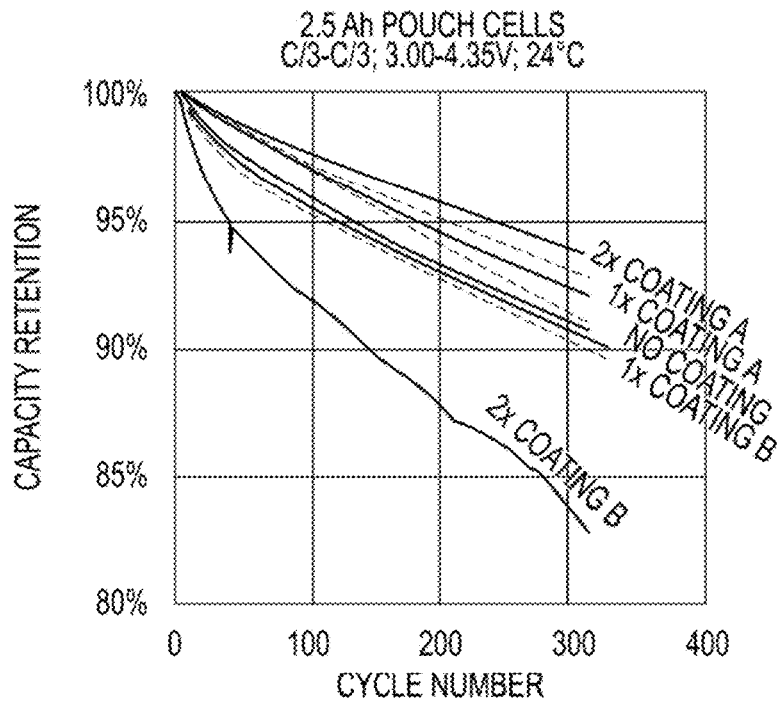
FIG. 9C depicts cycle number vs capacity retention for an uncoated (No Coating), and for an Alumina-coated (Coating A) and Titania-coated (Coating B) active material of two alternative embodiments of the present disclosure.
Figure 10:
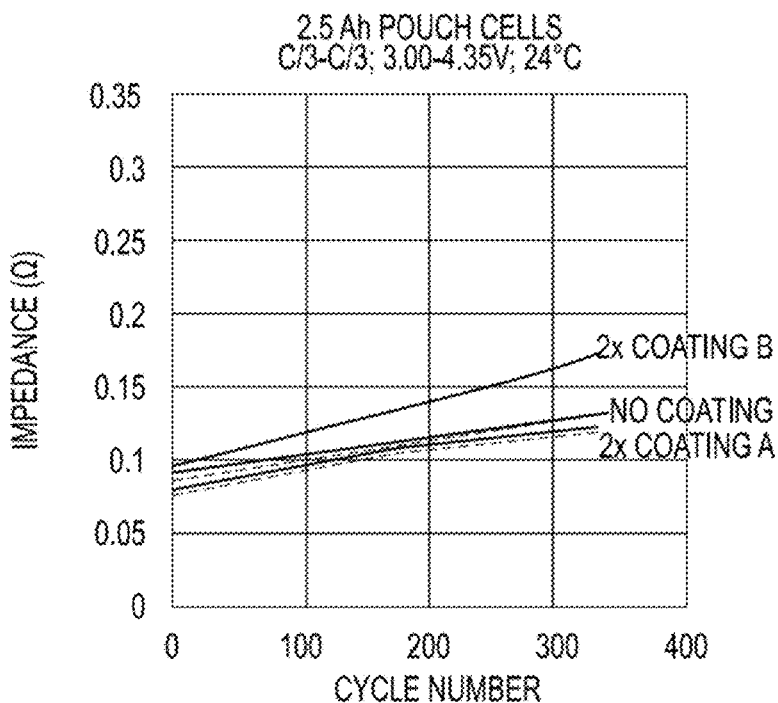
FIG. 10 depicts cycle number vs impedance, showing that impedance improves in certain embodiments of the present disclosure relative to uncoated materials.

FIGS. 9 and 10 depict the effect of coating 20 on capacity retention and impedance, respectively. FIGS. 9A and 9B demonstrate limitations on cycle life of uncoated particles. Uncoated particles typically achieve 200 to 400 cycles and are generally limited to fewer than 400 cycles.

FIG. 9C depicts the capacity retention of two alternative embodiments of the present disclosure relative to uncoated particles. FIG. 9C establishes that the uncoated particle (No Coating) has dropped to 90% capacity retention by 300 cycles. Testing of the samples depicted in FIG. 9C is ongoing at the time of filing. The present inventors anticipate that the No Coating sample will experience capacity fade as the cycle number approaches 400 and the sample will fall to 80% of capacity. In contrast, due to the higher mid-point voltage of embodiments of the present disclosure relative to uncoated materials, the present inventors anticipate that embodiments of the present invention may not experience comparable capacity fade.

As depicted in FIG. 9C, Coating A is an alumina coating on NMC active material, and Coating B is a titania coating on NMC active material. FIG. 9C evidences that "1×" Titania coating (Coating B), as well as the "1×" and "2×" Alumina coatings (Coating A), exhibit capacity retention comparable to or better than uncoated particles. The "1×" and "2×" designations reflect the relative thickness of the coating: "2×" indicating a coating twice as thick as the "1×" coating. The units are still on test at the time of filing this disclosure. The present inventors anticipate that the No Coating sample will exhibit capacity fade to less than 80% as the cycle number approaches 400 cycles. In contrast, the present inventors anticipate that the Coating A and Coating B samples will not experience comparable capacity fade. Extrapolating from the first 300 cycles, Coating A (1× and 2×) and Coating B (1×) may provide about 1,000 or more cycles. Although Coating B (2×) exhibits lower capacity, each of Coating A (1× and 2×) and Coating B (1×) exhibit about the same or higher capacity than uncoated particle. Extrapolating from the first 300 cycles, Coating A (1× and 2×) and Coating B (1×) each are expected to provide greater cycle life than uncoated particles.

Each point on the cycle vs capacity curves (FIGS. 9A, 9B, and 9C) represents an area under an individual discharge curve (voltage vs time). As shown in FIG. 9C, the mid-point voltage of these individual voltage vs time curves is higher than the uncoated material values for each of the Coating A (1× and 2×) and Coating B (1×) embodiments. Further, the mid-point voltage of these embodiments remains higher than the mid-point voltage of the uncoated active material over subsequent cycles. This characteristic may eliminate or mitigate voltage fade over cycling relative to uncoated active materials.

FIG. 10 reflects that Coating A exhibits lower resistance (impedance) than uncoated particle.

Embodiments of the present disclosure preferably comprise a thin coating. Nano-engineered coating 20 may be applied at a thickness between 2 and 2,000 nm. In a preferred embodiment, nano-engineered coating 20 may be deposited at a thickness between 2 and 10 nm.

In certain embodiments of the present disclosure, the thickness of coating 20 is also relatively uniform. As embodied herein, a thin coating 20 is within 10% of the target thickness. In a preferred embodiment of the present disclosure, thin coating 20 thickness is within about 5% of the target thickness. And, in more preferred embodiments, thin coating thickness is within about 1% of the target thickness. Certain techniques of the present disclosure, such as atomic layer deposition, are readily able to provide this degree of control over the thickness of coating 20, to provide a uniform, thin coating.

In alternative embodiments, the thickness of nano-engineered coating 20 may vary such that the coating is not uniform. Specifically, coating 20 that varies in thickness by more than about 10% of a target thickness of coating 20 is not considered uniform but may, nonetheless, comprise an embodiment of the present disclosure.

As embodied herein, coating 20 may be applied to active material particles 10 either before forming a slurry of active material or after the active material has been pasted on the substrate to form an electrode. Preferably, coating 20 is applied to the particles 10 of active material before forming a slurry and pasting an electrode. Similarly, coating 20 may be applied to solid-state electrolyte. In various embodiments, coating 20 is disposed between the electrode active material and electrolyte, whether liquid or solid-state electrolyte, to inhibit side reactions and maintain capacity of the electrochemical cell.

In a preferred embodiment of the present disclosure, nano-engineered coating 20 conforms to surface of the active material particle 10 or solid state electrolyte 160. Coating 20 preferable maintains continuous contact with the active material or solid-state electrolyte surface, filling interparticle and intraparticle pore structure gaps. In this configuration, nano-engineered coating 20 serves as a lithium diffusion barrier.

In certain embodiments, nano-engineered coating 20 may substantially impede or prevent electron transfer from the active material to SEI. In alternative embodiments, it may be conductive. Nano-engineered coating 20 form an artificial SEI. In preferred embodiments of the present disclosure, coating 20 limits electrical conduction between the electrolyte and active material in a way that electrolyte 160 does not experience detrimental side reactions, e.g., oxidation and reduction reactions, while permitting ionic transfer between active material and electrolyte. In certain embodiments, nano-engineered coating 20 is electrically conductive and, preferably, has a higher electrical conductivity than the active material. In other embodiments, nano-engineered coating 20 is electrically insulating, and may have a lower electrical conductivity than the active material.

Figure 14:
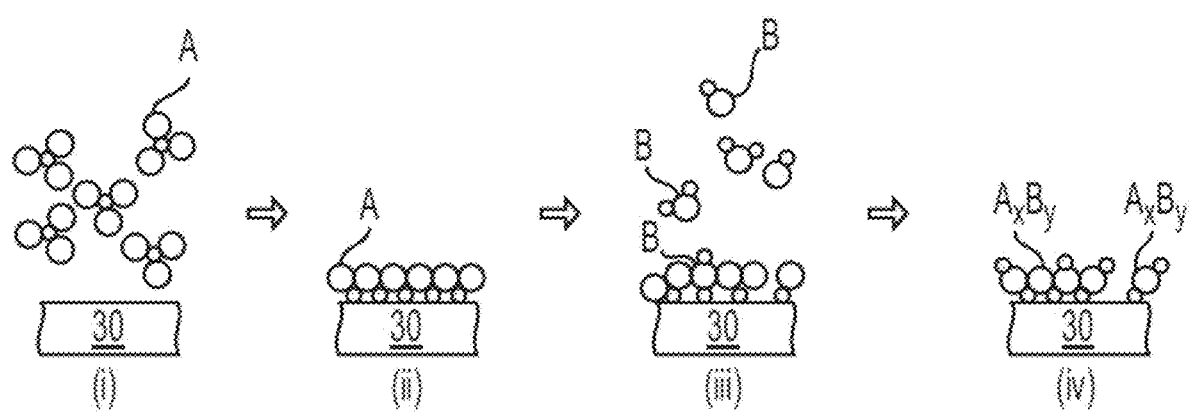
FIG. 14 is a schematic depiction of a process for manufacturing a coating of an embodiment of the present disclosure using atomic layer deposition.

FIG. 14 is a schematic depiction of coating during following a multi-step application process. As depicted in FIG. 14, nano-engineered coating 20 is applied to surface 30 of particle 10 or solid-state electrolyte 160. Coating 20 is formulated and applied so that it forms a discrete, continuous coating on surface. Coating may be non-reactive with surface or may react with surface in a predictable way to form a nano-engineered coating on surface. Preferably, coating 20 is mechanically-stable, thin, uniform, continuous, and non-porous.

In certain embodiments of the present disclosure, nano-engineered coating 20 may comprise an inert material. The present inventors consider several alternative formulations of the coated active material particles to be viable. Coatings may be applied to the same active material precursor powders, including: (i) metal oxide; (ii) metal halide; (iii) metal oxyflouride; (iv) metal phosphate; (v) metal sulfate; (vi) non-metal oxide; (vii) olivine(s); (viii) NaSICON structure(s); (ix) perovskite structure(s); (x) spinel structure(s); (xi) polymetallic ionic structure(s); (xii) metal organic structure(s) or complex(es); (xiii) polymetallic organic structure(s) or complex(es); (xiv) structure(s) with periodic properties; (xv) functional groups that are randomly distributed; (xvi) functional groups that are periodically distributed; (xvii) functional groups that are checkered microstructure; (xviii) 2D periodic arrangements; and (ixx) 3D periodic arrangements. Metals that may form appropriate metal phosphates include: alkali metals; transition metals; lanthanum; boron; silicon; carbon; tin; germanium; gallium; aluminum; and indium.

The selection of an appropriate coating depends, at least in part, on the coating material 20 and surface 30 to which it is being applied. Not every one of the above coating materials will provide enhanced performance relative to uncoated surfaces on every potential active material or solid-state electrolyte material. Specifically, coating 20 is preferably selected so that it forms a mechanically-stable coating 20 that provides ionic transfer while inhibiting undesirable side reactions. Appropriate coatings may be selected in a manner that the coating 20 does not react with surface 30 to which it is applied so that it modifies the underlying surface 30 material in an unpredictable manner.

Appropriate coatings may be selected in a manner that the coating 20 is non-porous and inhibits the direct exposure to electrolyte of the active materials.

Persons of ordinary skill in the art understand that undesirable combinations of coating 20 and surface 30 may be identified by criteria known as "Hume-Rothery" Rules (H-R). These rules identify thermodynamic criteria for when a solute and solvent will react in solid state, giving rise to solid solutions. The H-R rules may help identify when undesirable reactions between coating 20 and surface 30 may occur. These rules include four criteria. When the criteria are satisfied, undesirable and uncontrolled reactions between the coating and underlying active material may occur. Even if all four of the criteria are satisfied, a particular combination of coating 20 and substrate 30 may, nonetheless, be viable, namely, be mechanically-stable and effective as a coating of the present disclosure. Other thermodynamic criteria, in addition to the H-R rules, may be required to initiate reaction between the coating 20 and substrate 30. The four H-R rules are guidelines. All four of the rules need not be satisfied for side reactions to take occur, moreover, side reactions may occur even if only a subset of the rules is satisfied. Nonetheless, the rules may be useful in identifying suitable combinations of coating 20 and surface 30 materials.

First, the atomic radius of the solute and solvent atoms must differ by no more than 15%. This relationship is defined by Equation 4.

$$\% \text{ difference} = \left(\frac{r_{solute} - r_{solvent}}{r_{solvent}}\right) \times 100\% \leq 15\% \quad (4)$$

Second, the crystal structures of the solvent and solute must match.

Third, complete solubility occurs when the solvent and solute have the same valency. A metal dissolves in a metal of higher valency to a greater extent than it dissolves into one of lower valency.

Fourth, the solute and solvent should have similar electronegativity. If the difference in electronegativity is too great, the metals tend to form intermetallic compounds instead of solid solutions.

In general, when selecting coating materials, the H-R rules may be used to help identify coatings that will form mechanically-stable, thin, uniform, and continuous layers of coating that will not dissolve into the underlying active materials. Hence the more thermodynamically dissimilar the active material and the coatings are the more successfully stable the coating will likely be.

In certain embodiments, the material composition of the nano-engineered coating 20 may meet one or more battery performance characteristics. In certain embodiments, nano-engineered coating 20 may be electrically insulating. In other embodiments, it may not. Nano-engineered coating 20 may support stronger chemical bonding with electrolyte surface 30, or cathode or anode active material surface 30, to resist transformation or degradation of the surface 30 to a greater or lesser degree. Undesirable structural transformations or degradations may include cracking, changes in metal distribution, irreversible volume changes, and crystal phase changes. In another embodiment, a nano-engineered coating may substantially prevent surface cracking.

Example 1

An embodiment of the present invention was prepared using an alumina coating. The active material precursor, NMC powder, was processed through atomic layer deposition to deposit a coating of $Al_2O_3$ on the active material particles of NMC. The NMC powder was run through the ALD process eight times, at a temperature below 200° C., for 3 minutes per pass for a total processing time of 30 minutes, to deposit a 10 nm coating of $Al_2O_3$ on the NMC active material particles. The coated particles were then used to form a slurry of active material paste which was applied to the current collector to form electrodes. The electrodes were then made into batteries and tested relative to uncoated active material.

The coated material resulted in improved cycle life and 25% capacity increase, through cycle 350. These samples are still under testing at the time this disclosure is filed. The projected performance through end of cycle life of this example is greater than 1,000 cycles, with increased capacity and reduced resistance relative to uncoated material.

Example 2

An embodiment of the present invention was prepared using a titania coating. The active material precursor, NMC powder, was processed through atomic layer deposition to deposit a coating of $TiO_2$ on the active material particles of NMC. The NMC powder was run through the ALD process four times, at a temperature below 200° C., for 5 minutes per pass for a total processing time of 20 minutes, to deposit a 5 nm coating of $TiO_2$ on the NMC active material particles. The coated particles were then used to form a slurry of active material paste which was applied to the current collector to form electrodes. The electrodes were then made into batteries and tested relative to uncoated active material.

The $TiO_2$-coated material resulted in improved cycle life, through cycle 350. FIG. 9 depicts 1× Coating B. These samples are still under testing at the time this disclosure is filed. The projected performance through end of cycle life of this example is greater than 400 cycles.

In certain embodiments, nano-engineered coating 20 may substantially prevent cathode metal dissolution, oxidation, and redistribution. FIG. 4A depicts uncoated active material before cycling. As depicted in FIG. 4A, the surface is nonporous, compact, and uniform. FIG. 4B depicts the cathode material of FIG. 4A after experiencing cathode metal dissolution, oxidation, and redistribution. The surface appears porous, rough and non-uniform. FIGS. 8A and 8B depict a coated active material before and after cycling. They exhibit substantially the same surface uniformity as the metals in the active material beneath the coating are in substantially the same locations, evidencing that they have not undergone substantial cathode metal dissolution, oxidation, or redistribution.

In another embodiment, nano-engineered coating 20 may mitigate phase transition. For example, in an uncoated material, such as that depicted in FIGS. 4B and 5B, cycling of the active material results in a phase transition of layered-NMC to spinel-NMC. This spinel form has lower capacity. This transition is depicted in FIGS. 6A and 6B as a change in position of the reciprocal lattice points. In a coated material of the present disclosure, an alumina coating of $Al_2O_3$ is applied in a thickness of about 10 nm to the cathode active material particles. Upon cycling of the coated active material, no change is seen in the peaks of the SEM images. And no degradation of the lattice and of the surface after cycling is observed. This is depicted in FIG. 9 as coating A.

In another embodiment, nano-engineered coating 20 may enhance lithium-ion conductivity and lithium-ion solvation in the cathode. FIG. 10 depicts cycling performance of coating A, which exhibits lower resistance than the uncoated active material. This is due to Li-ion conductivity remaining high over cycling.

In another embodiment, nano-engineered coating 20 may filter passage of other atoms and/or molecules on the basis of their size. In some embodiments, the material composition of the nano-engineered coating is tailored to support size selectivity in ionic and molecular diffusion. For example, coating 20 may allow lithium ions to diffuse freely but larger cations, such as cathode metals and molecules such as electrolyte species, are blocked.

In some embodiments, nano-engineered coating 20 comprises materials that are elastic or amorphous. Exemplary coatings 20 include complexes of aluminum cations and glycerol, complexes of aluminum cations and glucose. In some of those embodiments, coating 20 maintains conformal contact with active material surfaces even under expansion. In certain embodiments, coating 20 may assist surface 30 to which it is applied in returning to its original shape or configuration.

In some embodiments, nano-engineered coating 20 comprises materials such that diffusion of intercalation ions from electrolyte 160 into coating 20 has a lower energy barrier than diffusion into active material uncoated surface 30. These may include an alumina coating of lithium nickel cobalt aluminum oxide, for example. In some embodiments, nano-engineered coating 20 may facilitate free intercalation ion-transport across the interface from coating into active material thereby bonding with active material surfaces 30.

In some embodiments, nano-engineered coating 20 comprises materials that undergo a solid state reaction with active material at surface 30 to create a new and mechanically-stable structure. Exemplary materials include a titania coating of lithium-nickel-cobalt-aluminum-oxide.

In some embodiments, electrolyte 160 may be chemically stable and coating 20 may comprise alumina or titania coating 20 on lithium titanate.

One of ordinary skill in the art would appreciate that any of the aforementioned exemplary material compositions of nano-engineered coating 20 may be used singularly or combined with one another, or with another material or materials to form composite nano-engineered coating 20.

Figure 11:
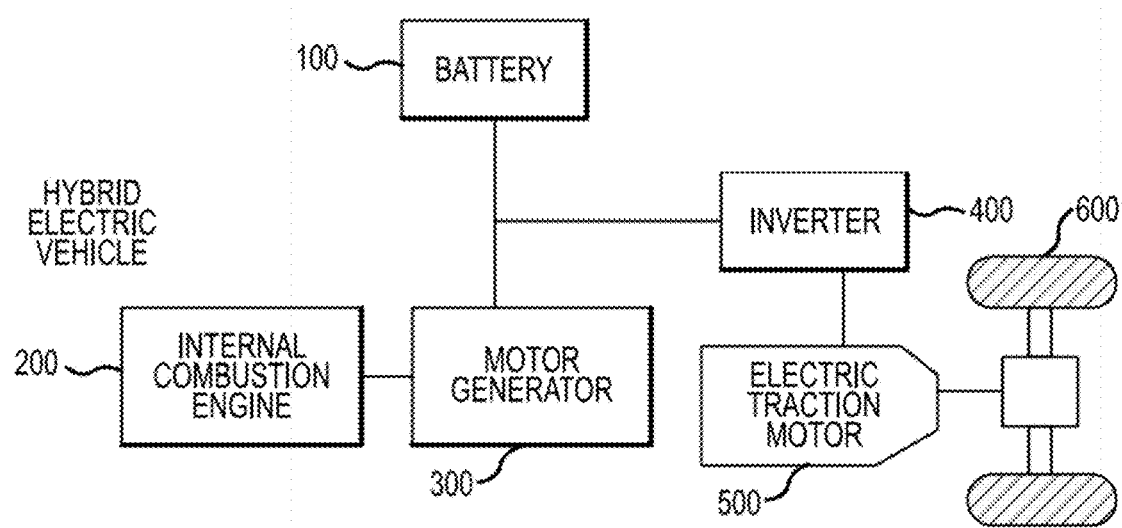
FIG. 11 is a schematic a hybrid-electric vehicle drive train.
Figure 12:
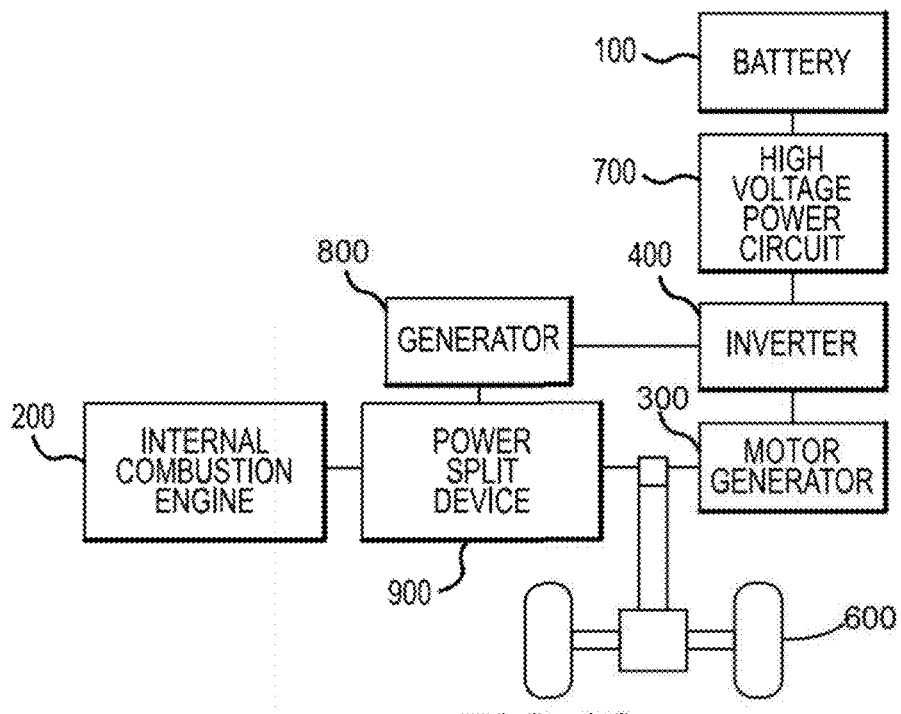
FIG. 12 is a schematic of an alternative embodiment of a hybrid-electric vehicle drive train. Batteries of embodiments of the present disclosure may be appropriate for use in various types of electric vehicles including, without limitation, hybrid-electric vehicles, plug-in hybrid electric vehicles, extended-range electric vehicles, or mild-/micro-hybrid electric vehicles

Batteries of embodiments of the present disclosure may be used for motive power or stationary power applications. FIGS. 11 and 12 are schematic diagrams depicting an electric vehicle 10 having a battery 100 of an exemplary embodiment of the present disclosure. As depicted in FIG. 10, Vehicle 10 may be a hybrid-electric vehicle. An internal combustion engine (ICE) 200 is linked to a motor generator 300. Electric traction motor 500 is configured to provide energy to vehicle wheels 600. Traction motor 500 may receive power from either battery 100 or motor generator 300 through power inverter 400. In some embodiments motor generator 500 may be located in a wheel hub and directly linked to traction motor 50. In other embodiments, motor generator 500 may be directly or indirectly linked to a transmission configured to provide power to wheels 600. In other embodiments, regenerative braking is incorporated in vehicle 10 so that motor generator 500 receives power from wheels 600 as well.

As depicted in FIGS. 11 and 12, an embodiment of the present disclosure may be used in battery pack 100. As depicted in FIGS. 10 and 11, battery 100 may be a lithium-ion battery pack. In other embodiments, battery 100 may be of other electrochemistries or multiple electrochemistries. See Dhar, et al., U.S. Patent Publication No. 2013/0244063, for "Hybrid Battery System for Electric and Hybrid Electric Vehicles," and Dasgupta, et al., U.S. Patent Publication No. 2008/0111508, for "Energy Storage Device for Loads Having Variable Power Rates," both of which are incorporated herein by reference in their entireties, as if fully set forth herein. Vehicle 10 may be a hybrid electric vehicle or all-electric vehicle.

Figure 13:
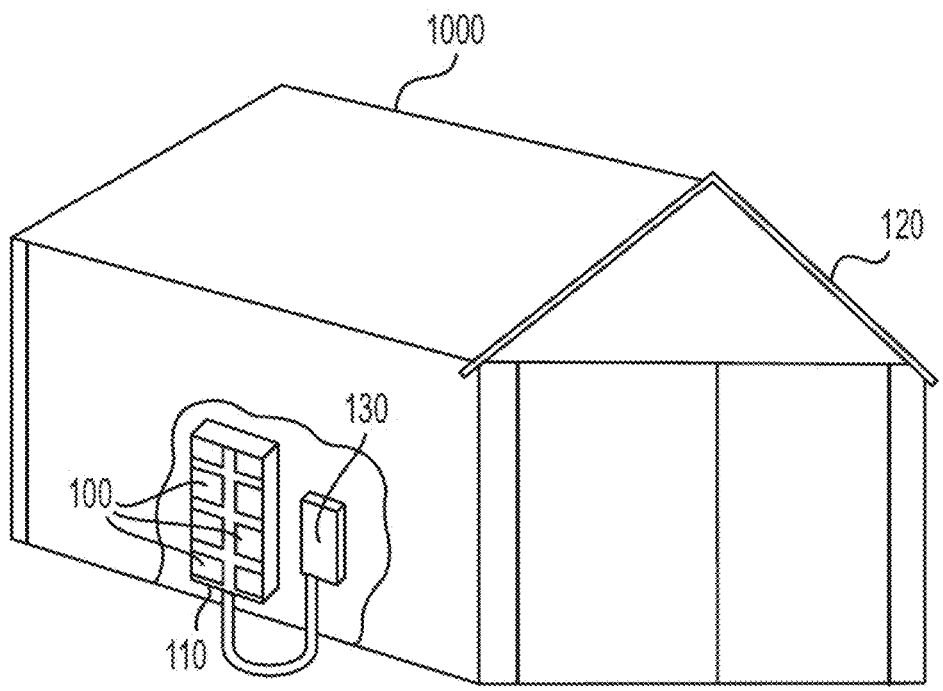
FIG. 13 depicts a stationary power application of an application of certain embodiments of the present disclosure.

FIG. 13 depicts a stationary power application 1000 powered by battery 100. Facility 120 may be any type of building including an office, commercial, industrial, or residential building. In an exemplary embodiment, energy storage rack 1100 includes batteries 100. Batteries 100 may be nickel-metal hydride (NiMH), other electrochemistries, or multiple electrochemistries. Energy storage rack 1100, as depicted in FIG. 13, may be connected to a distribution box 130. Electrical systems for facility 1200 may be linked to and powered by distribution box 130. Exemplary electrical systems may include power outlets, lighting, and heating, ventilating, and air conditioning systems.

Nano-engineered coating 20 of embodiments of the present disclosure may be applied in any of several ways. FIGS. 14, 15, 16, and 17, depict schematically several alternative application methods. FIG. 14 depicts a process for coating cathode active material, an anode active material, or a solid-state electrolyte material surface 30 using atomic layer deposition (ALD). As depicted in FIG. 14, the process comprise the steps of: (1) surface 30 is exposed to a precursor vapor (A) that reacts with surface 30; (2) the reaction between surface 30 and precursor vapor (A) yields a first layer of precursor molecules on surface (e.g., as shown in FIG. 14); (3) modified surface 30 is exposed to a second precursor vapor (B); (4) the reaction between surface 30 and precursor vapors (A) & (B) yields a second layer, bonded to the first layer, comprising compound $A_XB_Y$, $A_X$, or $B_Y$.

In this disclosure, atomic layer deposition and molecular layer deposition are used synonymously and interchangeably.

In some embodiments, nano-engineered coating 20 is applied by molecular layer deposition (e.g., coatings with organic backbones like aluminum glyceride). Surface 30 may be exposed to precursor vapors (A) and (B) by any of a number of techniques, including but not limited to adding the vapors to a chamber having the electrolyte therein; agitating a material to release precursor vapors (A) and/or (B); or agitating a surface of electrolyte to produce precursor vapors (A) and/or (B).

In certain embodiments, atomic layer deposition is preferably performed in a fluidized-bed system. Alternatively, surface 30 may held stationary and precursor vapors (A) and (B) allowed to diffuse into pores between surface 30 particles 10. In an alternative embodiment, surface 30 may be activated, e.g., heated or treated with a catalyst to improve contact between the electrolyte surface and precursor vapors. Atomic layer deposition is preferably performed at a temperature of approximately 150-200° C., and a deposition rate of about 100 to 300 nm per hour, for less than an hour. In other embodiments, ALD may be performed at higher or lower temperatures, e.g., room temperature (or 70° F.).

In another embodiment, surface may be exposed to precursor vapors in addition to precursor A and/or B. For example, catalyst 40 may be applied by atomic layer deposition to surface 30. In other embodiments, catalyst 40 may be applied by another deposition technique, including but not limited to the various deposition techniques discussed herein. Illustrative catalyst precursors include, but are not limited to, one or more of a metal nanoparticle, e.g., Au, Pd, Ni, Mn, Cu, Co, Fe, Pt, Ag, Ir, Rh, or Ru, or a combination of metals. Other catalysts may include, for example, PdO, NiO, $Ni_2O_3$, MnO, $MnO_2$, CuO, $Cu_2O$, FeO, $Fe_3O_4$.

In another embodiment, atomic layer deposition may include any one of the steps disclosed in Reynolds, et al., U.S. Pat. No. 8,956,761, for "Lithium Ion Battery and Method for Manufacturing of Such a Battery," which is incorporated herein by reference in its entirety as if fully set forth herein. In other embodiments, atomic layer deposition may include the step of fluidizing precursor vapor (A) and/or (B) before depositing nano-engineered coating 20 on surface 30. Kelder, et al., U.S. Pat. No. 8,993,051, for "Method for Covering Particles, Especially Battery Electrode Material Particles, and Particles Obtained with Such Method and A Battery Comprising Such Particle," which is incorporated herein by reference in its entirety, as if fully set forth herein. In alternative other embodiments, any precursor (e.g., A or B) can be applied in a solid state.

In another embodiment, repeating the cycle of introducing first and second precursor vapors (e.g., A, B of FIG. 14) may add a second monolayer of material onto surface 30. Precursor vapors can be mixed before, during, or after the gas phase.

Exemplary preferred coating materials for atomic layer deposition include metal oxides, self-assembling 2D structures, transition metals, and aluminum.

Figure 15:
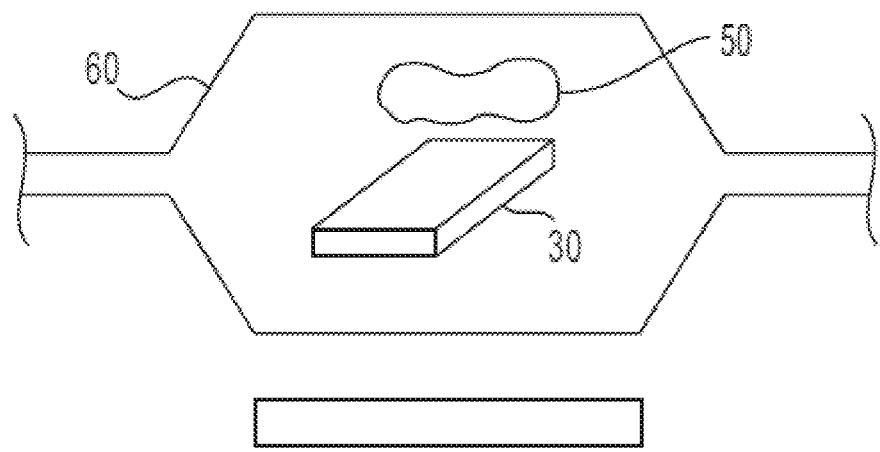
FIG. 15 is a schematic depiction of a process for manufacturing a coating of an embodiment of the present disclosure using chemical vapor deposition.

FIG. 15 depicts a process for applying coating 20 to surface 30 by chemical vapor deposition. In this embodiment, chemical vapor deposition is applied to a wafer on surface 30. Wafer is exposed to a volatile precursor 50 to react or decompose on surface 30 thereby depositing nano-engineered coating 20 on surface 30. FIG. 15 depicts a hot-wall thermal chemical vapor deposition operation that can be applied to a single electrolyte or multiple electrolytes simultaneously. Heating element is placed at the top and bottom of chamber 60. Heating energizes precursor 50 or causes it to come into contact with surface 30. In other embodiments, nano-engineered coating 20 may be applied by other chemical vapor deposition techniques, for example plasma-assisted chemical vapor deposition.

Figure 16:
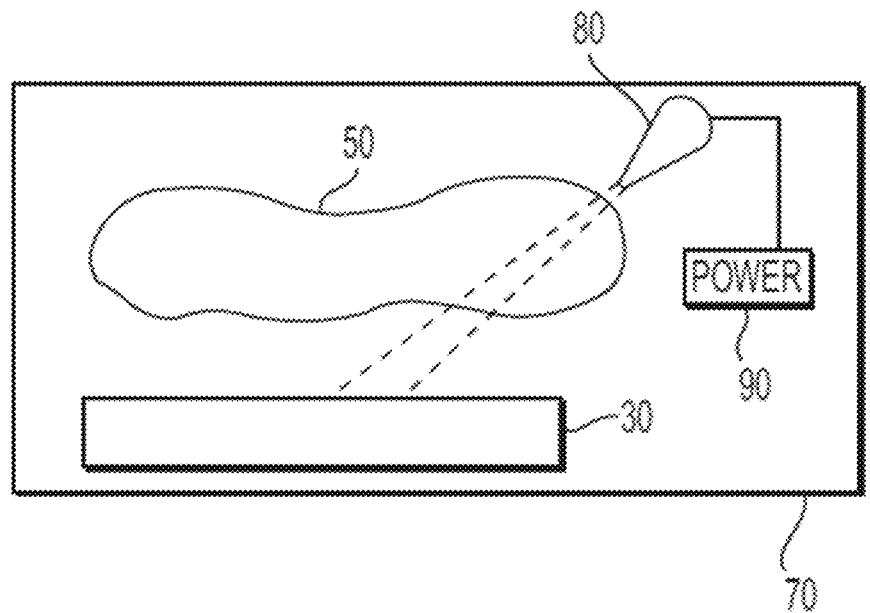
FIG. 16 is a schematic depiction of a process for manufacturing a coating of an embodiment of the present disclosure using electron beam deposition.

FIG. 16 depicts a process for applying coating 20 to surface 30 by electron beam deposition. Surface 30 and additive 50 are placed in vacuum chamber 70. Additive 50 is bombarded with an electron beam 80. Atoms of additive 50 are converted into a gaseous phase and precipitate on surface 30. Electron beam 80 is distributed by an apparatus 70 attached to power source 90.

Figure 17:
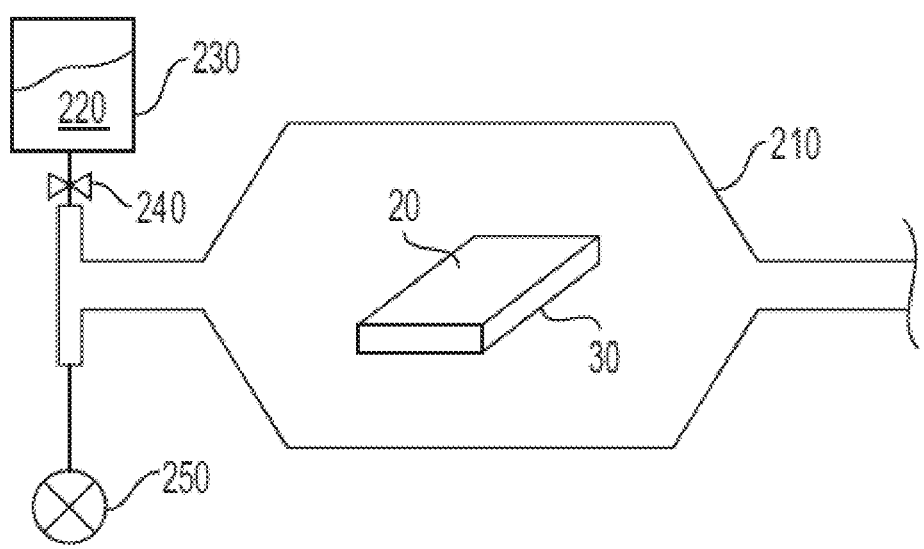
FIG. 17 is a schematic depiction of a process for manufacturing a coating of an embodiment of the present disclosure using vacuum deposition.

FIG. 17 depicts a process for applying coating 20 to surface 30 by using vacuum deposition (VD). Nano-engineered coating 20 is applied in a high-temperature vacuum chamber 210. Additives 220, from reservoir 230, evaporate and condensate onto surface 30. Valve 240 controls the flow of additives 220 into chamber 210. Pump 250 controls vacuum pressure in chamber 220.

Any of the aforementioned exemplary methods of applying nano-engineered coating 20 to surface 30 may be used singularly, or in combination with another method, to deposit nano-engineered coating 20 on surface 30. While one portion of surface 30 may be coated with a nano-engineered coating 20 of a certain material composition, another portion of surface 30 may be coated with a nano-engineered coating 20 of the same or different material composition.

Applications of nano-engineered coating to an electrolyte surface are not limited to the illustrated or discussed embodiments herein. In some designs nano-engineered coating 20 may be applied in a patterned formation to electrolyte surface providing alternate zones with high ionic conductivity and zones of high elasticity or mechanical strength. Exemplary material selections for nano-engineered coating of this design include POSS structures, block co-polymer structures, 2D and 3D structures that self-assemble under an energy field or minimum energy state, such as e.g., glass free energy minima. NEC can be randomly or periodically distributed in these embodiments.

Other application techniques may also be used to apply nano-engineered coating other than those illustrated or discussed herein. For example, in other embodiments nano-engineered coating application process includes laser deposition, plasma deposition, radio frequency sputtering (e.g., with LiPON coatings), sol-gel (e.g., with metal oxide, self-assembling 2D structures, transition metals or aluminum coatings), microemulsion, successive ionic layer deposition, aqueous deposition, mechanofusion, solid-state diffusion, doping or other reactions.

Embodiments of the present disclosure may be implemented in any type of battery including solid-state batteries. Batteries can have different electrochemistries such as for example, zinc-mercuric oxide, zinc-copper oxide, zinc-manganese dioxide with ammonium chloride or zinc chloride electrolyte, zinc-manganese dioxide with alkaline electrolyte, cadmium-mercuric oxide, silver-zinc, silver-cadmium, lithium-carbon, Pb-acid, nickel-cadmium, nickel-zinc, nickel-iron, NIMH, lithium chemistries (like e.g., lithium-cobalt oxide, lithium-iron phosphate, and lithium NMC), fuel cells or silver-metal hydride batteries. It should be emphasized that embodiments of the present disclosure are not limited to the battery types specifically described herein; embodiments of the present disclosure may be of use in any battery type.

The present teachings are applicable to batteries for supporting various electrical systems, e.g., electric vehicles, facility energy storage, grid storage and stabilization, renewable energy sources, portable electronic devices and medical devices, among others. "Electric vehicles" as used in this disclosure includes, but is not limited to.

Further, the elements or components of the various embodiments disclosed herein may be used together with other elements or components of other embodiments.

It is intended that the specification and examples be considered as exemplary only, with a true scope and spirit of the invention being indicated by the following claims.

We claim:

1. A battery cathode, comprising:
    a plurality of nickel-rich cathode active material particles comprising lithium-nickel-manganese-cobalt-oxide or lithium-nickel-cobalt-aluminum-oxide, and
    wherein the cathode active material particles contain 80% nickel or higher
    a nano-engineered coating formed from an atomic layer deposition (ALD) or molecular layer deposition (MLD) layer of coating material disposed on the surface of one or more of the cathode active material particles that undergoes a solid state reaction with the cathode active material particle surface to create the nano-engineered coating on the coated cathode active material particles;
    wherein the nano-engineered coating is obtained by 4 to 8 cycles of ALD or MLD
    the ALD or MLD layer of coating material comprising one or more of a: metal oxide, metal halide, metal oxyflouride, metal phosphate, metal sulfate, non-metal oxide, polymetallic ionic structures, metal organic complex, or organic complex, the nano-engineered coating being ionically-conductive, wherein the nano-engineered coating is configured to prevent one or more undesirable cathode active material particle transformations selected from the group: particle cracking, changes in metal distribution, irreversible volume changes or crystal phase changes; and wherein the nano-engineered coating comprises a thickness between 2 and 10 nm.

2. The battery cathode of claim 1, wherein the nano-engineered coating comprises $Al_2O_3$, $TiO_2$, or LiPON.

3. The battery cathode of claim 1, wherein the nano-engineered coating comprises a layer comprising $Al_2O_3$, $TiO_2$, or LiPON and having a thickness between 2 and 10 nm.

4. The battery cathode of claim 1, wherein the ALD layer comprises alumina or titania and the cathode active material comprises lithium-nickel-manganese-cobalt-oxide.

5. The battery cathode of claim 4, wherein the ALD layer comprises alumina.

6. The battery cathode of claim 5, wherein the possesses about the same or higher capacity as compared to a battery made from the uncoated powder.

7. The battery cathode of claim 1, wherein the nano-engineered coating comprises LiPON and the cathode active material comprises lithium-nickel-manganese-cobalt-oxide.

8. A battery, comprising:
an anode;
a cathode comprising a plurality of cathode active material particles and the cathode active material particles contain 80% nickel or higher;
an electrolyte configured to provide ionic transfer between the anode and the cathode; and
a microscopic layer of material deposited on the surface of one or more of the cathode active material particles comprising lithium-nickel-manganese-cobalt-oxide or lithium-nickel-cobalt-aluminum-oxide before the cathode active material particles are mixed into a slurry and applied to a current collector to form the cathode;
the microscopic layer comprising one or more of a: metal oxide, metal halide, metal oxyflouride, metal phosphate, metal sulfate, non-metal oxide, polymetallic ionic structure, metal organic complex, or organic complex,
wherein the microscopic layer comprises a thickness of 2 to 10 nm and is obtained by 4 to 8 cycles of atomic layer deposition or molecular layer deposition coating that undergoes a solid state reaction with the cathode active material particle surface, and
the microscopic layer is configured to prevent one or more undesirable cathode active material particle transformations selected from the group: particle cracking, changes in metal distribution, irreversible volume changes or crystal phase changes.

9. The battery of claim 8, wherein the layer of coating material comprises one or more of a metal selected from a group consisting of: alkali metals; transition metals; lanthanum; boron; silicon; carbon; tin; germanium; gallium; aluminum; and indium.

10. The battery of claim 8, wherein the atomic layer deposition coating comprises alumina or titania coated on a nickel-rich cathode active material surface.

11. The battery of claim 8, wherein the microscopic layer comprises a uniform coating.

12. The battery of claim 8, wherein the microscopic layer comprises a coating conforming to the surface.

13. The battery of claim 8, wherein the microscopic layer comprises a continuous coating.

14. A lithium-ion battery comprising the battery cathode of claim 1, wherein the battery cathode has been cycled in an electrolyte comprising lithium ions.

15. A solid-state lithium-ion battery comprising the battery cathode of claim 1, wherein the battery cathode has been cycled in a solid-state electrolyte comprising lithium ions.

16. The battery cathode of claim 3, wherein the cathode active material comprises lithium-nickel-cobalt-aluminum-oxide.

17. A battery cathode powder, comprising:
a plurality of lithium-nickel-manganese-cobalt-oxide cathode active material particles containing 80% nickel or higher, and
a layer of coating material disposed on the surface of one or more of the cathode active material particles;
the coating material comprising one or more of an aluminum: oxide, halide, oxyflouride, phosphate, sulfate, polymetallic ionic structure, organic complex, or polymetallic organic complex; the layer of coating material being ionically-conductive, and
wherein the layer of coating material is obtained by a solid-state reaction between the cathode active material and 4 to 8 cycles of an atomic layer deposition or molecular layer deposition coating at the surface of the cathode active material particles.

18. The battery cathode of claim 1, wherein the nano-engineered coating substantially prevents particle cracking and/or irreversible volume changes.

19. The battery of claim 8, wherein the microscopic layer substantially prevents particle cracking and/or irreversible volume changes.

20. The battery cathode powder of claim 17, wherein the layer of coating material comprises alumina or titania.

21. The battery cathode of powder of claim 20 wherein powder possesses about the same or higher capacity as compared to the uncoated powder.

22. The battery of claim 10, wherein the cathode active material comprises lithium-nickel-manganese-cobalt-oxide.

* * * * *